(12) United States Patent
Kostromine et al.

(10) Patent No.: US 11,267,943 B2
(45) Date of Patent: Mar. 8, 2022

(54) FILM STRUCTURE CONTAINING A PHOTOPOLYMER LAYER FOR HOLOGRAPHIC EXPOSURE AND A COATING LAYER OF HIGH RESISTANCE

(71) Applicant: Covestro Deutschland AG, Leverkusen (DE)

(72) Inventors: Serguei Kostromine, Swisttal-Buschhoven (DE); Benjamin Herzberg, Cologne (DE); Thomas Rölle, Leverkusen (DE); Dennis Hönel, Zuelpich-Wichterich (DE); Thomas Fäcke, Leverkusen (DE); Heinz-Guenter Auweiler, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 194 days.

(21) Appl. No.: 16/611,527

(22) PCT Filed: May 8, 2018

(86) PCT No.: PCT/EP2018/061828
§ 371 (c)(1),
(2) Date: Nov. 7, 2019

(87) PCT Pub. No.: WO2018/206556
PCT Pub. Date: Nov. 15, 2018

(65) Prior Publication Data
US 2021/0292505 A1    Sep. 23, 2021

(30) Foreign Application Priority Data

May 9, 2017    (EP) ..................................... 17170294

(51) Int. Cl.
| | | |
|---|---|---|
| *G03H 1/02* | (2006.01) | |
| *G03H 1/00* | (2006.01) | |
| *G11B 7/253* | (2013.01) | |
| *G11B 7/254* | (2013.01) | |
| *C08F 2/50* | (2006.01) | |
| *C08J 7/04* | (2020.01) | |
| *C08K 5/5398* | (2006.01) | |
| *C08L 29/14* | (2006.01) | |

(52) U.S. Cl.
CPC .............. *C08J 7/0427* (2020.01); *C08F 2/50* (2013.01); *C08K 5/5398* (2013.01); *C08L 29/14* (2013.01); *G03H 1/0011* (2013.01); *G03H 1/0248* (2013.01); *G03H 1/0256* (2013.01); *G11B 7/253* (2013.01); *G11B 7/254* (2013.01); *G03H 2250/39* (2013.01); *G03H 2260/12* (2013.01); *G11B 2007/25402* (2013.01)

(58) Field of Classification Search
CPC ....... C08F 2/50; C08K 1/5398; C08K 5/5398; C08L 29/14; G03H 1/0011; G03H 1/0248; G03H 1/0256; G03H 2250/29; G03H 2260/12; G11B 7/253; G11B 7/254; G11B 2007/25402
See application file for complete search history.

(56) References Cited

U.S. PATENT DOCUMENTS

| | | | |
|---|---|---|---|
| 4,185,009 A | | 1/1980 | Idel et al. |
| 4,913,971 A | | 4/1990 | Beck et al. |
| 4,950,567 A | * | 8/1990 | Keys ................. B32B 17/10036 430/1 |
| 4,959,283 A | * | 9/1990 | Smothers ................ G03F 7/001 430/1 |
| 4,994,347 A | * | 2/1991 | Smothers ................ G03F 7/001 430/1 |
| 5,235,026 A | | 8/1993 | Wulff et al. |
| 5,260,149 A | * | 11/1993 | Monroe ................... G03F 7/027 359/3 |
| 5,367,044 A | | 11/1994 | Rosenquist |
| 6,075,626 A | | 6/2000 | Mizutani et al. |
| 6,228,973 B1 | | 5/2001 | McCloskey et al. |
| 6,586,556 B2 | | 7/2003 | Kratschmer et al. |
| 6,613,869 B1 | | 9/2003 | Horn et al. |
| 7,425,358 B2 | | 9/2008 | Heuer et al. |
| 7,547,755 B2 | | 6/2009 | Heuer |
| 8,771,903 B2 | | 7/2014 | Hönel et al. |
| 8,889,322 B2 | | 11/2014 | Weiser et al. |
| 9,057,946 B2 | | 6/2015 | Fäcke et al. |
| 9,073,296 B2 | | 7/2015 | Fäcke et al. |
| 9,098,065 B2 | | 8/2015 | Hönel et al. |

(Continued)

FOREIGN PATENT DOCUMENTS

| | | |
|---|---|---|
| CN | 104040629 A | 9/2014 |
| DE | 1031512 B | 6/1958 |

(Continued)

OTHER PUBLICATIONS

International Search Report for PCT/EP2018/061709 dated Aug. 9, 2018.
International Search Report for PCT/EP2018/061715 dated Jul. 16, 2018.
International Search Report for PCT/EP2018/061826 dated Aug. 9, 2018.
International Search Report for PCT/EP2018/061828 dated Jul. 19, 2018.
Written Opinion of the International Searching Authority for PCT/EP2018/061709 dated Aug. 9, 2018.

(Continued)

*Primary Examiner* — Martin J Angebranndt
(74) *Attorney, Agent, or Firm* — Faegre Drinker Biddle & Reath LLP

(57) ABSTRACT

The invention relates to a layer construction comprising a curable protective layer C and a photopolymer layer B, to a method for producing such a layer construction, to a method for producing a hologram using such a layer construction, to a sealed holographic medium and to the use of such a layer construction for producing a hologram.

14 Claims, No Drawings

(56) References Cited

U.S. PATENT DOCUMENTS

| | | | |
|---|---|---|---|
| 9,195,215 B2 | 11/2015 | Weiser et al. | |
| 9,261,778 B2 | 2/2016 | Weiser et al. | |
| 9,804,490 B2 | 10/2017 | Rölle et al. | |
| 10,241,402 B2 | 3/2019 | Rölle et al. | |
| 10,901,368 B2* | 1/2021 | Stasiak | B42D 25/46 |
| 11,059,930 B2* | 7/2021 | Kostromine | C08F 283/008 |
| 2003/0134105 A1 | 7/2003 | Toshine et al. | |
| 2005/0112971 A1 | 5/2005 | Panse | |
| 2006/0078803 A1* | 4/2006 | Takizawa | G03F 7/029 |
| | | | 430/1 |
| 2006/0194122 A1* | 8/2006 | Takizawa | G03F 7/001 |
| | | | 430/1 |
| 2008/0102378 A1* | 5/2008 | Cole | G11B 7/24044 |
| | | | 430/2 |
| 2008/0176146 A1* | 7/2008 | Tomita | G03F 7/033 |
| | | | 430/2 |
| 2011/0207029 A1* | 8/2011 | Hagen | G03F 7/09 |
| | | | 430/2 |
| 2011/0318567 A1 | 12/2011 | Hildenbrand et al. | |
| 2012/0321998 A1* | 12/2012 | Rolle | C08G 18/48 |
| | | | 430/2 |
| 2013/0182301 A1 | 7/2013 | Tsukada et al. | |
| 2013/0224634 A1 | 8/2013 | Berneth et al. | |
| 2013/0252140 A1* | 9/2013 | Facke | G03C 1/733 |
| | | | 430/2 |
| 2014/0295329 A1* | 10/2014 | Weiser | G11B 7/2542 |
| | | | 430/2 |
| 2016/0002487 A1* | 1/2016 | Weiser | B29C 63/0095 |
| | | | 428/412 |
| 2017/0363957 A1* | 12/2017 | Roelle | G03F 7/0046 |
| 2019/0018365 A1* | 1/2019 | Stasiak | G03H 1/0248 |
| 2020/0166888 A1* | 5/2020 | Kostromine | G03H 1/0011 |
| 2020/0166889 A1* | 5/2020 | Kostromine | B32B 23/08 |
| 2020/0241471 A1* | 7/2020 | Kostromine | B32B 27/302 |

FOREIGN PATENT DOCUMENTS

| | | |
|---|---|---|
| DE | 2500092 A1 | 7/1976 |
| DE | 3702394 A1 | 7/1988 |
| DE | 3729068 A1 | 3/1989 |
| DE | 4240313 A1 | 6/1994 |
| DE | 19943642 A1 | 3/2001 |
| EP | 0223587 A1 | 5/1987 |
| EP | 0517044 A2 | 12/1992 |
| EP | 0949547 A2 | 10/1999 |
| EP | 1506249 A1 | 2/2005 |
| EP | 1582549 A1 | 10/2005 |
| EP | 2613318 A1 | 7/2013 |
| EP | 2772917 A1 | 9/2014 |
| EP | 2786378 A1 | 10/2014 |
| EP | 2962302 A1 | 1/2016 |
| JP | S49125380 A | 11/1974 |
| JP | 2002358018 A | 12/2002 |
| JP | 2006023455 A | 1/2006 |
| JP | 2006023456 A | 1/2006 |
| SU | 519417 A1 | 6/1976 |
| WO | WO-02026862 A1 | 4/2002 |
| WO | WO-03095521 A1 | 11/2003 |
| WO | WO-2005113639 A1 | 12/2005 |
| WO | WO-2008037364 A1 | 4/2008 |
| WO | WO-2011054797 A1 | 5/2011 |
| WO | WO-2011067057 A1 | 6/2011 |
| WO | WO-2012020061 A1 | 2/2012 |
| WO | WO-2012062655 A2 | 5/2012 |
| WO | WO-2012062658 A1 | 5/2012 |
| WO | WO-2013079422 A1 | 6/2013 |
| WO | WO-2014131795 A1 | 9/2014 |
| WO | WO-2015091427 A1 | 6/2015 |
| WO | 2016016426 * | 2/2016 |
| WO | WO-2016091965 A1 | 6/2016 |
| WO | 2017081078 * | 5/2017 |

OTHER PUBLICATIONS

Written Opinion of the International Searching Authority for PCT/EP2018/061715 dated Jul. 16, 2018.

Written Opinion of the International Searching Authority for PCT/EP2018/061826 dated Aug. 9, 2018.

Written Opinion of the International Searching Authority for PCT/EP2018/061828 dated Jul. 19, 2018.

* cited by examiner

FILM STRUCTURE CONTAINING A PHOTOPOLYMER LAYER FOR HOLOGRAPHIC EXPOSURE AND A COATING LAYER OF HIGH RESISTANCE

CROSS-REFERENCE To RELATED APPLICATIONS

This application is a national stage application (under 35 U.S.C. § 371) of PCT/EP201.8/061828, filed May 8, 2018, which claims benefit of European Application No. 17170294.7, filed May 9, 2017, both of which are incorporated herein by reference in their entirety.

The invention relates to a layer construction comprising a curable protective layer C and a photopolymer layer B, to a method for producing such a layer construction, to a method for producing a hologram using such a layer construction, to a sealed holographic medium and to the use of such a layer construction for producing a hologram.

Photopolymer layers for producing holographic media are known in principle, for example from WO 2011/054797 and WO 2011/067057. Advantages of these holographic media are their high light diffraction efficiency and simplified processing since after holographic irradiation no further chemical and/or thermal development steps are necessary.

The holographic film (Bayfol® HX from Covestro Deutschland AG) consists of a film substrate (A) and a light sensitive photopolymer layer (B). Optical holograms are formed in the layer (B) by local photopolymerization and fixed by areal UV-VIS irradiation. Thus layer (B) forms a no-longer-photosensitive, through-polymerized layer (B') comprising a previously inscribed hologram. While this hologram is per se very stable over time, its properties can change as a result of mechanical influences and/or on contact with for example organic substances (solvents).

Conceivable methods of protection are lacquering, laminating, adhesive affixing of a protective layer and/or a protective film. However, classical lacquering or adhesive affixing gives rise to manifold problems associated with liquid lacquer and/or adhesive components which on contact with the (B') layer completely destroy the hologram or on account of severe optical shift render it useless.

Patent applications EP 2613318 A1 and EP 2962302 A1 describe that by suitable selection of the components protective layers can be applied atop an irradiated photopolymer layer. These protective layers are producible by reaction of at least one radiation-curable resin I), an isocyanate-functional resin II) and a photoinitiator system III).

Patent application EP 2772917 A1 describes a layer construction composed of at least one protective layer and at least one irradiated photopolymer layer. The protective layer is applied atop the irradiated photopolymer layer as an aqueous radiation-curable polymer dispersion and then cured.

While the layer constructions described in patent applications EP 2613318 A1, EP 2962302 A1 and EP 2772917 A1 do have a protective layer atop the photopolymer layer which has very little effect on the optical properties of the irradiated photopolymer layer these protective layers are only ever applied atop the irradiated photopolymer layer subsequently and the unirradiated photopolymer layer therefore remains exposed to harmful environmental influences.

The patent application EP 2786378 A1 discloses layer constructions composed of an unirradiated photopolymer layer and a protective layer. The protective layer is to this end applied atop the unirradiated photopolymer layer in a "wet" state, i.e. as a solution or dispersion. However in industrial practice it is complex and costly to construct appropriate liquid application plants and provide personnel to monitor the coating process. Lamination processes are therefore preferred but have the disadvantage that they often result in film composites having insufficient adhesion.

It is therefore desirable for a protective layer (C) to fulfil the following requirements:

The photosensitivity of the photopolymer layer (B) must not be affected either spectrally or in respect of dose.

The inscribed holograms in a film construction A-B-C-D shall in identical construction and only with minimally differing quality be inscribed in the film construction A-B-C-D in the same way as in the construction A-B (Bayfol HX) without any protective layers.

Optical fixing of the hologram by UV/VIS irradiation shall likewise effect complete curing of the protective layer (C) and form the layer (C').

The cured protective layer (C') shall adhere very well atop the holographic layer (B'), namely so well that the substrate film (D) can be residuelessly peeled off from the A-B'-C' construction without delamination of the layer B'-C'.

As the outer layer of the layer construction the layer (C') shall ensure permanent resistance to commonly used organic solvents, aqueous acids and alkalis, cosmetics, household and industrial cleaning compositions, and/or sufficient scratch resistance against mechanical influences.

The present invention has for its object to provide a layer construction where the unirradiated photopolymer layer is already protected by a protective layer without affecting its photosensitivity, the protective layer may be subsequently cured and the cured protective layer ensures a permanent resistance against commonly used organic solvents, aqueous acids and alkalis, cosmetics, household and industrial cleaning compositions, and/or sufficient scratch resistance against mechanical influences.

This object is achieved by a layer construction comprising a curable protective layer C and an areal photopolymer layer B at least partly joined to the protective layer C, characterized in that the protective layer C comprises I) at least one thermoplastic resin selected from the group consisting of polyvinylbutyral with $M_w \geq 100\,000$ g/mol or amorphous polymethyl methacrylate with $M_w \geq 10\,000\,000\,000$ g/mol;

II) at least one reactive diluent selected from the group consisting of pentaerythritol triacrylate, dipentaerythritol pentaacrylate, dipentaerythritol hexaacrylate, compound of formula (Ia)

Formula (Ia)

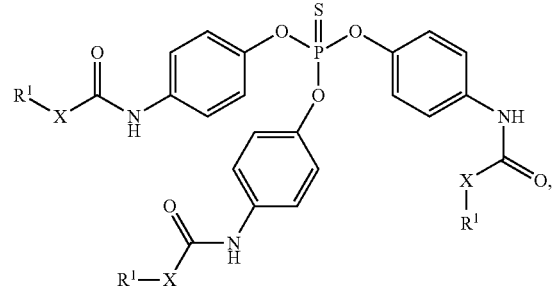

compound of formula (Ib)

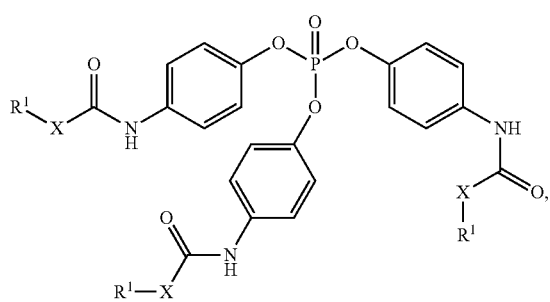

Formula (Ib)

compound of formula (Ic)

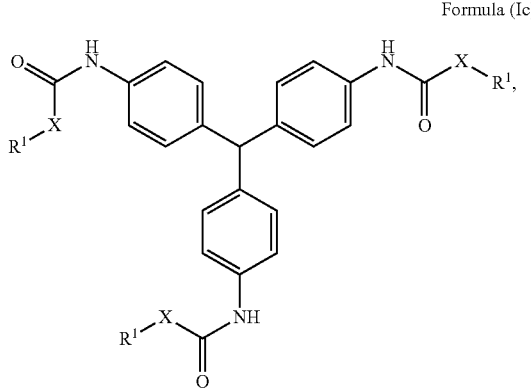

Formula (Ic)

wherein in formulae (Ia) to (Ic)
$R^1$ is independently at each occurrence a radiation-curable group
X is independently at each occurrence a single bond between $R^1$ and C=O or a linear, branched or cyclic optionally heteroatom-containing and/or optionally functional-group-substituted hydrocarbon radical,
compound of formula (II)

wherein in formula (II)
$R^1$ and X are as defined in formula (Ia)-(Ic),
$R^{11}$ is a linear or branched, optionally heteroatom-substituted aliphatic, aromatic or araliphatic radical,
$R^{12}$ is independently at each occurrence up to four substituents selected from methyl, ethyl, propyl, n-butyl, tert.-butyl, chloro, bromo, iodo, methylthio, phenyl and/or phenylthio,
$R^{13}$ is independently at each occurrence up to five substituents selected from methyl, ethyl, propyl, n-butyl, tert.-butyl, chloro, bromo, iodo, methylthio, phenyl and/or phenylthio,
compound of formula (III)

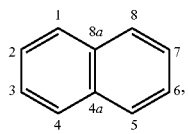

formula (III)

i) which at at least one of the carbon atoms 1, 2, 3, 4, 5, 6, 7, 8 is substituted with an $R_{acryl}$ radical of formula (IV),

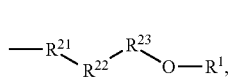

Formula (IV)

wherein in formula (IV)
$R^1$ is as defined in formulae (Ia)-(Ic),
$R^{21}$ is oxygen or sulfur,
$R^{22}$ is a carboxamide (—C(O)N—) or a carboxylic ester (—C(O)O—) or a sulfonamide (—SO$_2$N—) group,
$R^{23}$ is a saturated or unsaturated or linear or branched optionally substituted radical comprising 2-10 carbon atoms or a polyether comprising up to five (—CH$_2$—CH$_2$—O—)— or (—C(CH$_3$)H—CH$_2$—O—)— groups or a polyamine comprising up to five nitrogen atoms and
ii) the compound of formula (III) is substituted at at least one further carbon atom 1, 2, 3, 4, 5, 6, 7, 8 with a radical of formula (V),

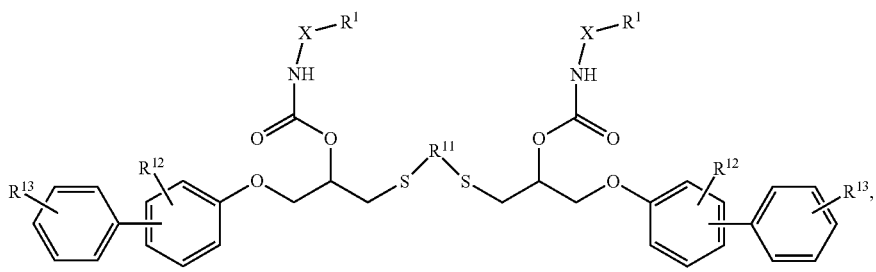

Formula (II)

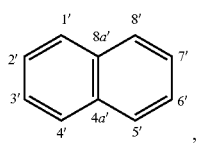

Formula (V)

wherein in formula (V)
the carbon atoms of the compound of formula (V) are each independently substituted with hydrogen, halogen, a cyano group, a nitro group or an optionally substituted alkyl, alkenyl, alkynyl, aralkyl, aryl or heteroaryl group or an optionally substituted alkoxy or alkylthio group or a carbamoyl group substituted as desired, which may also be bonded in bridging fashion to a radical of formula (III), or a trifluoromethyl group or a trifluoromethoxy group or an $R_{acryl'}$ radical of formula (VI),

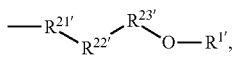

Formula (VI)

wherein in formula (VI)
$R^{1'}$ has the same definition as $R^1$ in formula (IV),
$R^{21'}$ is oxygen or sulfur,
$R^{22'}$ is a carboxamide (—C(O)N—) or a carboxylic ester (—C(O)O—) or a sulfonamide (—SO$_2$N—) group,
$R^{23'}$ is a saturated or unsaturated or linear or branched optionally substituted radical comprising 2-10 carbon atoms or a polyether comprising up to five (—CH$_2$—CH$_2$—O—)— or (—C(CH$_3$)H—CH$_2$—O—)— groups or a polyamine comprising up to five nitrogen atoms,
iii) the remaining carbon atoms of the compound of formula (III) are each independently substituted with hydrogen, halogen, a cyano group, a nitro group or an optionally substituted alkyl, alkenyl, alkynyl, aralkyl, aryl or heteroaryl group or an optionally substituted alkoxy or alkylthio group or a trifluoromethyl group or a trifluoromethoxy group and
compound of formula (VII)

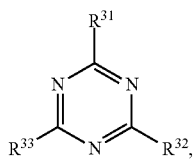

(VII)

wherein in formula der Formula (VII)
$R^{31}$, $R^{32}$, $R^{33}$ are each independently of one another OH, halogen or an organic radical, wherein at least one of the radicals is an organic radical comprising a radiation-curable group; and
III) at least one photoinitiator.

The advantage of the layer construction according to the invention is that this already allows a scaling of the unirradiated photopolymer layer without adversely affecting the photosensitivity of the photopolymer layer either spectrally or in respect of the required dose for the writing of holograms into the photopolymer. Furthermore, the "dry" application of the protective layer atop the unirradiated photopolymer layer avoids provision of complex and costly machines and specially trained personnel as required for example for "wet" painting. A further advantage is that optical fixing of the hologram by UV/VIS irradiation likewise cures the protective layer so that no further processing steps are required. The very good adhesion of the cured protective layer on the photopolymer layer ensures not only that the optionally present substrate layer D may be residuelessly peeled off but also ensures a permanent resistance against commonly used organic solvents, aqueous acids and alkalis, cosmetics, household and industrial cleaning compositions, and/or sufficient scratch resistance against mechanical influences.

The term "areal" in the context of the present invention is to be understood as meaning a configuration as a planar area or else as a concavely or convexly vaulted or undulating area. In the context of the invention the hologram-containing photopolymer B must therefore have a planar, vaulted or undulating area in order that lamination of the sealing layer is made possible in the hologram region at least.

Reactive diluents in the context of the invention are preferably compounds which reduce the starting viscosity of the curable composition and in the course of the curing of the curable composition form a chemical bond with the thermoplastic resin and curing agent to form a network.

The word "a" in the context of the present invention in connection with countable parameters is to be understood as meaning the number "one" only when this is stated explicitly (for instance by the expression "precisely one"). When reference is made hereinbelow for example to "a polyisocyanate" the word "a" is to be understood as meaning merely the indefinite article and not the number one, this therefore also encompasses an embodiment in which two or more, for example structurally dissimilar, polyisocyanates are present.

In a further embodiment the photopolymer layer B is disposed on a substrate layer A, wherein the photopolymer layer B is on one side at least partly joined to the substrate layer A and the photopolymer layer B is on the other side at least partly joined to the protective layer C.

In a further embodiment the protective layer C is disposed on a substrate layer D, wherein the protective layer C is on one side at least partly joined to the substrate layer D and the protective layer C is on the other side at least partly joined to the photopolymer layer B.

In a further embodiment the photopolymer layer B is disposed on a substrate layer A, wherein the photopolymer layer B is on one side at least partly joined to the substrate layer A and the photopolymer layer B is on the other side at least partly joined to the protective layer C, and the protective layer C is disposed on a substrate layer D, wherein the protective layer C is on one side at least partly joined to the substrate layer D and the protective layer C is on the other side at least partly joined to the photopolymer layer B. The layers are arranged in the sequence A-B-C-D.

In a further embodiment the layer construction according to the invention is composed of at least four layers at least partly joined to one another, wherein the layers are arranged directly atop one another in the sequence substrate layer A, photopolymer layer B, protective layer C and substrate layer D.

In a further embodiment the protective layer C has a thickness of 1 to 100 μm, preferably of 2 to 50 μm and very particularly preferably of 3 to 25 μm.

In a further embodiment the protective layer C contains a UV absorber, preferably in an amount of 0.01% to 10% by weight, more preferably in an amount of 0.1% to 5% by weight, in each case based on the total weight of the protective layer C.

In a further embodiment the reactive diluent is pentaerythritol triacrylate, a compound of formulae (Ia), (Ib), (Ic), (II), (III), (VII) and/or mixtures thereof, preferably pentaerythritol triacrylate and a compound of formula (Ia) and/or mixtures thereof, yet more preferably a compound of formula (Ia)

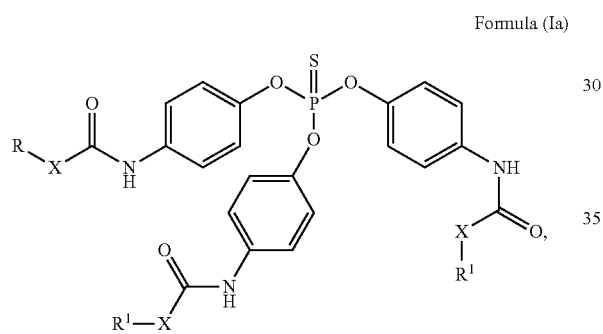

Formula (Ia)

wherein $R^1$ is independently at each occurrence a radiation-curable group

X is independently at each occurrence a single bond between $R^1$ and C=O or a linear, branched or cyclic optionally heteroatom-containing and/or optionally functional-group-substituted hydrocarbon radical, and/or mixtures thereof.

In a further embodiment the photopolymer layer B contains polyurethane matrix polymers, acrylate writing monomers and photoinitiators; preferably the matrix polymers are crosslinked, yet more preferably the matrix polymers are three-dimensionally crosslinked.

The invention likewise provides a process for producing the layer construction according to the invention, wherein atop a photopolymer layer B a protective layer C is applied, characterized in that the protective layer C comprises I) at least one thermoplastic resin selected from the group consisting of polyvinylbutyral with $M_w \geq 100\,000$ g/mol or amorphous polymethyl methacrylate with $M_w \geq 100\,000$ g/mol;

II) at least one reactive diluent selected from the group consisting of pentaerythritol triacrylate, dipentaerythritol pentaacrylate, dipentaerythritol hexaacrylate, compound of formula (Ia)

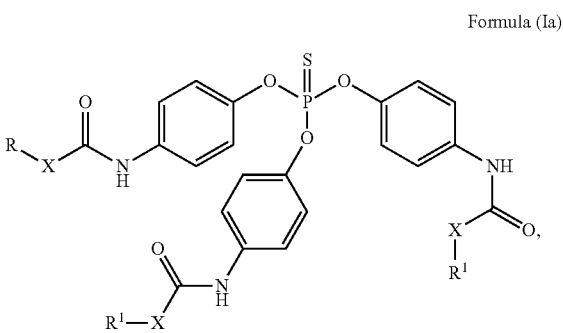

Formula (Ia)

compound of formula (Ib)

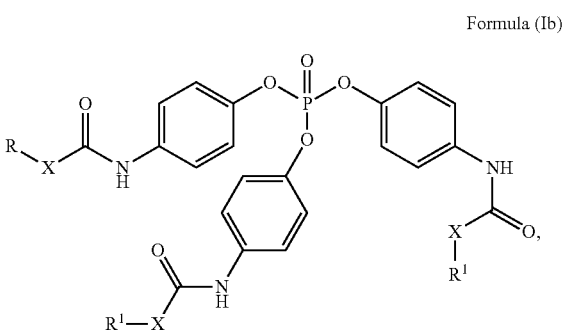

Formula (Ib)

compound of formula (Ic)

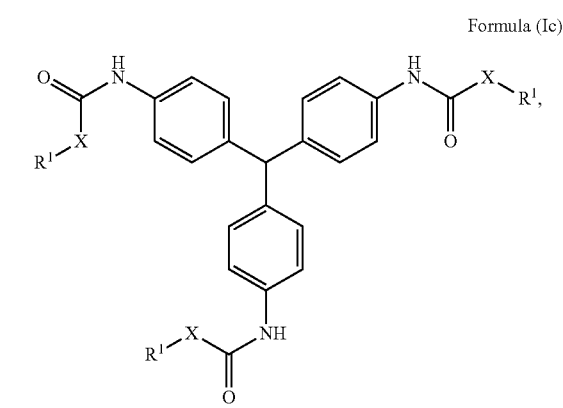

Formula (Ic)

wherein in formulae (Ia) to (Ic)

$R^1$ is independently at each occurrence a radiation-curable group and

X is independently at each occurrence a single bond between $R^1$ and C=O or a linear, branched or cyclic optionally heteroatom-containing and/or optionally functional-group-substituted hydrocarbon radical, compound of formula (II)

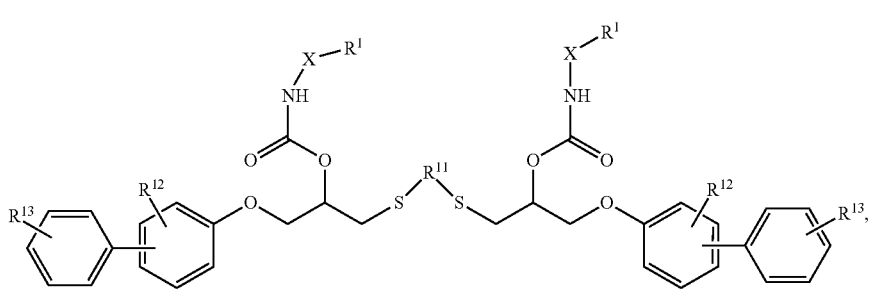
Formula (II)

wherein in formula (II)
$R^1$ and X is as defined in formula (Ia)-(Ic),
$R^{11}$ is a linear or branched, optionally heteroatom-substituted aliphatic, aromatic or araliphatic radical,
$R^{12}$ is independently at each occurrence up to four substituents selected from methyl, ethyl, propyl, n-butyl, tert-butyl, chlorine, bromine, iodine, methylthio, phenyl and/or phenylthio,
$R^{13}$ is independently at each occurrence up to five substituents selected from methyl, ethyl, propyl, n-butyl, tert-butyl, chlorine, bromine, iodine, methylthio, phenyl and/or phenylthio,
compound of formula (III)

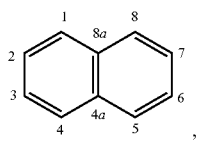
Formula (III)

i) which is substituted at at least one of the carbon atoms 1, 2, 3, 4, 5, 6, 7, 8 with an $R_{acryl}$ radical of formula (IV),

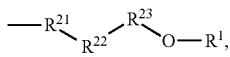
Formula (IV)

wherein in formula (IV)
$R^1$ is as defined in formula (Ia)-(Ic),
$R^{21}$ is oxygen or sulfur,
$R^{22}$ is a carboxamide (—C(O)N—) or a carboxylic ester (—C(O)O—) or a sulfonamide (—$SO_2$N—) group,
$R^{23}$ is a saturated or unsaturated or linear or branched optionally substituted radical comprising 2-10 carbon atoms or a polyether comprising up to five (—$CH_2$—$CH_2$—O—)— or (—C($CH_3$)H—$CH_2$—O—)— groups or a polyamine comprising up to five nitrogen atoms and
ii) the compound of formula (III) is at at least one further carbon atom 1, 2, 3, 4, 5, 6, 7, 8 substituted with a radical of formula (V),

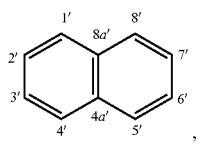
Formula (V)

wherein in formula (V)
the carbon atoms of the compound of formula (V) are each independently substituted with hydrogen, halogen, a cyano group, a nitro group or an optionally substituted alkyl, alkenyl, alkynyl, aralkyl, aryl or heteroaryl group or an optionally substituted alkoxy or alkylthio group or any substituted carbamoyl group, which also may be linked bridgingly to a radical of formula (III), or a trifluoromethyl group or a trifluoromethoxy group or an $R_{acryl'}$ radical of formula (VI),

Formula (VI)

wherein in formula (VI)
$R^{1'}$ has the same definition as $R^1$ in formula (IV),
$R^{21'}$ is oxygen or sulfur,
$R^{22'}$ is a carboxamide (—C(O)N—) or a carboxylic ester (—C(O)O—) or a sulfonamide (—$SO_2$N—) group,
$R^{23'}$ is a saturated or unsaturated or linear or branched optionally substituted radical comprising 2-10 carbon atoms or a polyether comprising up to five (—$CH_2$—$CH_2$—O—)— or (—C($CH_3$)H—$CH_2$—O—)— groups or a polyamine comprising up to five nitrogen atoms,
iii) the remaining carbon atoms of the compound of formula (III) are each independently substituted with hydrogen, halogen, a cyano group, a nitro group or an optionally substituted alkyl, alkenyl, alkynyl, aralkyl, aryl or heteroaryl group or an optionally substituted alkoxy or alkylthio group or a trifluoromethyl group or a trifluoromethoxy group,
and compound of formula (VII)

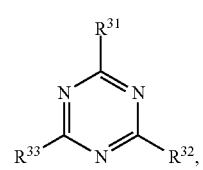
(VII)

wherein in formula (VII)
$R^{31}$, $R^{32}$, $R^{33}$ are each independently of one another OH, halogen or an organic radical, wherein at least one of the radicals is an organic radical comprising a radiation-curable group; and
III) at least one photoinitiator.
In one embodiment of the process according to the invention the photopolymer layer B is disposed on a substrate layer A or another carrier, for example glass or plastic.

In one embodiment of the process according to the invention the protective layer C is disposed on a substrate layer D.

In one embodiment of the process according to the invention the photopolymer layer B is disposed on a substrate layer A or another carrier, for example glass or plastic, and the protective layer C is disposed on a substrate layer D.

In one embodiment of the invention, the process according to the invention serves to produce a layer construction wherein the photopolymer layer B is disposed on a substrate layer A, wherein the photopolymer layer B is on one side at least partly joined to the substrate layer A and the photopolymer layer B is on the other side at least partly joined to the protective layer C.

In one embodiment of the invention, the process according to the invention serves to produce a layer construction wherein the protective layer C is disposed on a substrate layer D, wherein the protective layer C is on one side at least partly joined to the substrate layer D and the protective layer C is on the other side at least partly joined to the photopolymer layer B.

In one embodiment of the invention, the process according to the invention serves to produce a layer construction wherein the photopolymer layer B is disposed on a substrate layer A, wherein the photopolymer layer B is on one side at least partly joined to the substrate layer A and the photopolymer layer B is on the other side at least partly joined to the protective layer C, and the protective layer C is disposed on a substrate layer D, wherein the protective layer C is on one side at least partly joined to the substrate layer D and the protective layer C is on the other side at least partly joined to the photopolymer layer B. The layers are arranged in the sequence A-B-C-D.

In one embodiment of the process according to the invention the layer construction according to the invention is composed of at least four layers at least partly joined to one another, wherein the layers are arranged directly atop one another in the sequence substrate layer A, photopolymer layer B, protective layer C and substrate layer D.

In one embodiment of the process according to the invention in a first step the photopolymer layer B is applied atop a substrate layer A to afford a layer composite A-B, in a second step the protective layer C is applied atop a substrate layer D to afford a layer composite C-D and in a third step the layer composite A-B is areally joined to the layer composite C-D to obtain a layer composite A-B-C-D, wherein the layer composite A-B is preferably joined to the layer composite C-D by lamination.

In one embodiment of the process according to the invention the protective layer C has a thickness of 1 to 100 μm, preferably of 2 to 50 μm and very particularly preferably of 3 to 25 μm.

In one embodiment of the process according to the invention the protective layer C contains a UV absorber, preferably in an amount of 0.01% to 10% by weight, preferably in an amount of 0.1% to 5% by weight, in each case based on the total weight of the protective layer C.

In one embodiment of the process according to the invention the reactive diluent is pentaerythritol triacrylate, a compound of formula (Ia), (Ib), (Ic), (II), (III), (VII) and/or mixtures thereof, preferably a compound of formula (Ia) and/or mixtures thereof, yet more preferably a compound of formula (Ia)

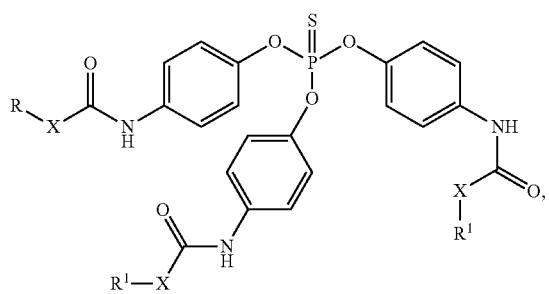

Formula (Ia)

wherein $R^1$ is independently at each occurrence a radiation-curable group

X is independently at each occurrence a single bond between $R^1$ and C=O or a linear, branched or cyclic optionally heteroatom-containing and/or optionally functional-group-substituted hydrocarbon radical, and/or mixtures thereof.

In one embodiment of the process according to the invention the photopolymer layer B contains polyurethane matrix polymers, acrylate writing monomers and photoinitiators; preferably the matrix polymers are crosslinked, yet more preferably the matrix polymers are three-dimensionally crosslinked.

The invention likewise provides a process for producing a hologram comprising the steps of:

a) providing a multilayer recording material containing a layer composite A-B-C-D comprising I) a substrate layer A, II) a photopolymer layer B;

III) a protective layer C, comprising

IIIa) at at least one thermoplastic resin selected from the group consisting of polyvinylbutyral with $M_w \geq 100\,000$ g/mol or amorphous polymethyl methacrylate with $M_w \geq 100\,000$ g/mol;

IIIb) at least one reactive diluent selected from the group consisting of pentaerythritol triacrylate, dipentaerythritol pentaacrylate, dipentaerythritol hexaacrylate, compound of formula (Ia)

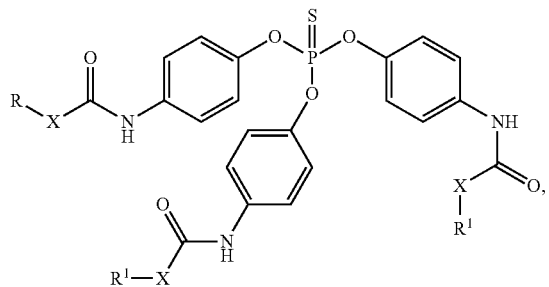

Formula (Ia)

compound of formula (Ib)

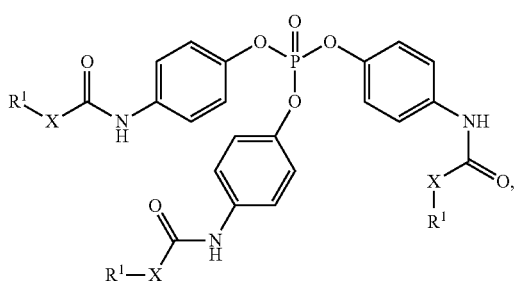

compound of formula (Ic)

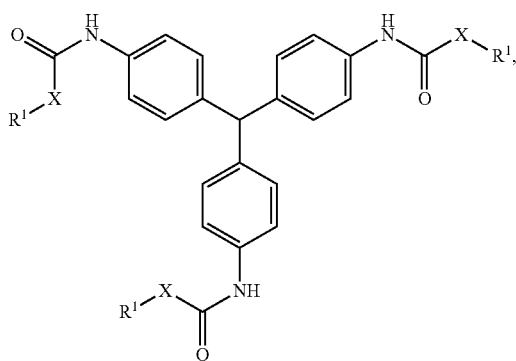

wherein in formulae (Ia) to (Ic)

$R^1$ is independently at each occurrence a radiation-curable group and

X is independently at each occurrence a single bond between $R^1$ and C=O or a linear, branched or cyclic optionally heteroatom-containing and/or optionally functional-group-substituted hydrocarbon radical, compound of formula (II)

wherein in formula (II)

$R^1$ and X are as defined in formula (Ia)-(Ic), $R^{11}$ is a linear or branched, optionally heteroatom-substituted aliphatic, aromatic or araliphatic radical, $R^{12}$ is independently at each occurrence up to four substituents selected from methyl, ethyl, propyl, n-butyl, tert-butyl, chlorine, bromine, iodine, methylthio, phenyl and/or phenylthio, $R^{13}$ is independently at each occurrence up to five substituents selected from methyl, ethyl, propyl, n-butyl, tert-butyl, chlorine, bromine, iodine, methylthio, phenyl and/or phenylthio, compound of formula (III)

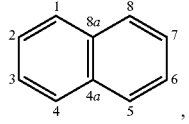

i) which is substituted at at least one of the carbon atoms 1, 2, 3, 4, 5, 6, 7, 8 with an $R_{acryl}$ radical of formula (IV),

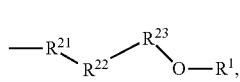

wherein in formula (IV)

$R^1$ is as defined in formula (Ia)-(Ic), $R^{21}$ is oxygen or sulfur, $R^{22}$ is a carboxamide (—C(O)N—) or a carboxylic ester (—C(O)O—) or a sulfonamide (—SO$_2$N—) group, $R^{23}$ is a saturated or unsaturated or linear or branched optionally substituted radical comprising 2-10 carbon atoms or a polyether comprising up to five (—CH$_2$—CH$_2$—O—)— or (—C(CH$_3$)H—CH$_2$—O—)— groups or a polyamine comprising up to five nitrogen atoms, and ii) the compound of formula (III) is at at least one further carbon atom 1, 2, 3, 4, 5, 6, 7, 8 substituted with a radical of formula (V),

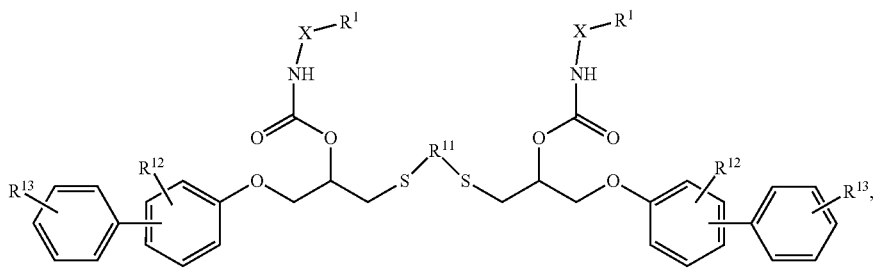

Formula (V)

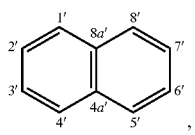

wherein in formula (V)
the carbon atoms of the compound of formula (V) are each independently substituted with hydrogen, halogen, a cyano group, a nitro group or an optionally substituted alkyl, alkenyl, alkynyl, aralkyl, aryl or heteroaryl group or an optionally substituted alkoxy or alkylthio group or any substituted carbamoyl group, which also may be linked bridgingly to a radical of formula (III), or a trifluoromethyl group or a trifluoromethoxy group or an $R_{acryl'}$ radical of formula (VI), Formula (VI)

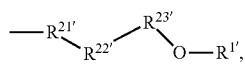

wherein in formula (VI)
$R^{1'}$ has the same definition as $R^1$ in formula (IV),
$R^{21'}$ is oxygen or sulfur,
$R^{22'}$ is a carboxamide (—C(O)N—) or a carboxylic ester (—C(O)O—) or a sulfonamide (—SO$_2$N—) group,
$R^{23'}$ is a saturated or unsaturated or linear or branched optionally substituted radical comprising 2-10 carbon atoms or a polyether comprising up to five (—CH$_2$—CH$_2$—O—)— or (—C(CH$_3$)H—CH$_2$—O—)— groups or a polyamine comprising up to five nitrogen atoms,
iii) the remaining carbon atoms of the compound of formula (III) are each independently substituted with hydrogen, halogen, a cyano group, a nitro group or an optionally substituted alkyl, alkenyl, alkynyl, aralkyl, aryl or heteroaryl group or an optionally substituted alkoxy or alkylthio group or a trifluoromethyl group or a trifluoromethoxy group, and
compound of formula (VII)

(VII)

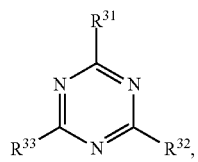

wherein in formula (VII)
$R^{31}$, $R^{32}$, $R^{33}$ are each independently of one another OH, halogen or an organic radical, wherein at least one of the radicals is an organic radical comprising a radiation-curable group; and
IIIc) comprises at least one photoinitiator, and
IV) a substrate layer D,
wherein the layers in the sequence substrate layer A, photopolymer layer B, protective layer C and substrate layer D are arranged directly atop one another,
b) photoinscribing a hologram into the photopolymer layer B to form a layer composite A-B*-C-D, wherein B* is a photopolymer layer with an inscribed hologram;
c) subjecting the layer composite A-B*-C-D from step (b) to actinic radiation, preferably UV-VIS radiation, to form a layer composite A-B'-C'-D, wherein B' is the bleached, through-polymerized and no-longer-photosensitive photopolymer layer B comprising a fixed hologram and C' is the cured protective layer C; and
d) delaminating the substrate layer D of the layer composite A-B'-C'-D from step (c) to form a layer composite A-B'-C'.

In one embodiment of the process according to the invention the protective layer C has a thickness of 1 to 100 μm, preferably of 2 to 50 μm and very particularly preferably of 3 to 25 μm.

In one embodiment of the process according to the invention the protective layer C contains a UV absorber, preferably in an amount of 0.01% to 10% by weight, more preferably in an amount of 0.1% to 5% by weight, in each case based on the total weight of the protective layer C.

In one embodiment of the process according to the invention the reactive diluent is pentaerythritol triacrylate, a compound of formula (Ia), (Ib), (Ic), (II), (III), (VII) and/or mixtures thereof, preferably pentaerythritol triacrylate and a compound of formula (Ia) and/or mixtures thereof, yet more preferably a compound of formula (Ia)

Formula (Ia)

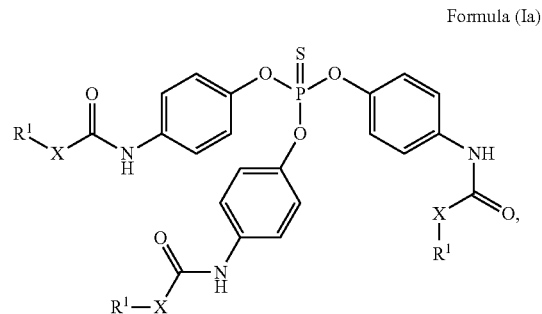

wherein
$R^1$ is independently at each occurrence a radiation-curable group and
X is independently at each occurrence a single bond between $R^1$ and C═O or a linear, branched or cyclic optionally heteroatom-containing and/or optionally functional-group-substituted hydrocarbon radical, and/or mixtures thereof In one embodiment of the process according to the invention the photopolymer layer B contains polyurethane matrix polymers, acrylate writing monomers and photoinitiators; preferably the matrix polymers are crosslinked, yet more preferably the matrix polymers are three-dimensionally crosslinked.

The present invention likewise provides a sealed holographic medium comprising a layer construction A-B'-C' obtainable by the inventive process for producing a hologram.

The layer construction A-B-C-D according to the invention fulfills the purpose of being a holographic medium. At least one hologram may be photoinscribed into the holographic medium.

The inscription of the hologram is followed by the optical fixing process/the subjection to actinic radiation. Optical fixing of the hologram is preferably effected by areal broadband UV/VIS irradiation of the entire layer construction A-B*-C-D with a light energy dose of 1-10 J/cm$^2$. During the fixing, residues of writing monomers that were not involved in the local formation of the hologram are through-polymerized in the entire layer B*. The dyes used as sensitizers are likewise photochemically destroyed. The strong technological discoloration of the layer B (and of the subsequent layer B*) caused by dyes disappears entirely. The layer B* is bleached and is converted into a no-longer-photoactive, dye-free stable layer B' comprising an inscribed hologram. Protective layer C is cured by polymerization of reactive diluent with the thermoplastic resin, thus forming the protective layer C'. The protective layer C' adheres atop the holographic layer (B') so well that the substrate layer (D) can be harmlessly peeled off from the A-B'-C' construction.

The hologram is formed in the layer B through direct holographic irradiation of the inventive film construction A-B-C-D. This causes the layer B to be converted into layer B*. The invention further provides the layer construction A-B*-C-D comprising an inscribed hologram in the layer B.

The quality of the hologram is defined by the following criteria in accordance with ISO standard 17901-1:2015(E). In simplified form the hologram may be regarded as an optical grating having a period which in the ideal case is determined by the wavelength of the writing laser ($\lambda_w$). As a diffractive element this grating reflects the light with the wavelength ($\lambda_w$). On account of the high efficiency of the hologram this reflection may be analysed with a spectral in transmission and appears in the spectrum as a peak (at $\lambda_{peak}$) with reduced transmission. This reduction in transmission $$T_{Red} = (100\% - T_{peak(A-B'-C')}\%) \tag{1}$$

serves as a measure for the reflective power (visible "strength" or "quality") of the hologram.

In the context of the invention the "strength" of the hologram which may be inscribed in the inventive construction A-B-C-D is not worse at all or not substantially worse than is the case in the construction A-B without any protective layers. This difference ΔT may be calculated by formula (2):

$$\Delta T = (100\% - T_{peak(A-B'-C')}\%) - (100\% - T_{peak(A-B')}\%) \tag{2}$$

It is preferable when this difference ΔT is <20%, particularly preferably <15% and especially preferably <10%.

The spectral shift of the transmission spectrum is defined as the difference (Δλ) between the wavelength of the inscribing laser ($\lambda_w$) and the spectral peak of the inscribed hologram ($\lambda_{peak}$) (ISO standard 17901-1:2015(E)):

$$\Delta\lambda = \lambda_{peak} - \lambda_w \tag{3}$$

It is preferable when Δλ of the inscribed hologram in the inventive layer construction A-B'-C' is +/−10 nm, more preferably +/−5 nm, particularly preferably +/−3 nm.

In one embodiment the inventive layer construction A-B'-C' is characterized in that the substrate layer A is one of the films recited below, the layer B' is a crosslinked bleached stable plastic coating including at least one hologram, the layer C' is a crosslinked stable plastic coating which as the outer layer of the holographic layer construction exhibits the properties of the protective layer, namely a permanent resistance to commonly used organic solvents, aqueous acids and alkalis, cosmetics, household and industrial cleaning compositions, and sufficient scratch resistance against mechanical influences.

Substrate Layer A

The substrate layer A is preferably a thermoplastic substrate layer/substrate film or another carrier, for example glass, plastic, metal or wood. Materials or material composites of the thermoplastic substrate layer A are based on polycarbonate (PC), polyethylene terephthalate (PET), amorphous polyesters, polybutylene terephthalate, polyethylene, polypropylene, cellulose acetate, cellulose hydrate, cellulose nitrate, cycloolefin polymers, polystyrene, hydrogenated polystyrene, polyepoxides, polysulfone, thermoplastic polyurethane (TPU), cellulose triacetate (CTA), polyamide (PA), polymethyl methacrylate (PMMA), polyvinyl chloride, polyvinyl acetate, polyvinyl butyral or polydicyclopentadiene or mixtures thereof. They are particularly preferably based on PC, PET, PA, PMMA and CTA. Material composites may be film laminates or coextrudates. Preferred material composites are duplex and triplex films constructed according to one of the schemes A/B, A/B/A or A/B/C. Particularly preferred are PC/PMMA, PC/PA, PC/PET, PET/PC/PET and PC/TPU. It is preferable when substrate layer A is transparent in the spectral region of 400-800 nm.

Photopolymer Layer B

The photopolymer layer B comprises matrix polymers, writing monomers and photoinitiators.

Employable matrix polymers are amorphous thermoplastics, for example polyacrylates, polymethyl methacrylates or copolymers of methyl methacrylate, methacrylic acid or other alkyl acrylates and alkyl methacrylates, and also acrylic acid, for example polybutyl acrylate, and also polyvinyl acetate and polyvinyl butyrate, the partially hydrolysed derivatives thereof, such as polyvinyl alcohols, and copolymers with ethylene and/or further (meth)acrylates, gelatins, cellulose esters and cellulose ethers such as methyl cellulose, cellulose acetobutyrate, silicones, for example polydimethylsilicone, polyurethanes, polybutadienes and polyisoprenes, and also polyethylene oxides, epoxy resins, in particular aliphatic epoxy resins, polyamides, polycarbonates and the systems cited in U.S. Pat. No. 4,994,347A and therein.

It is particularly preferable, however, when the matrix polymers are polyurethanes.

It is also particularly preferable when the matrix polymers have been crosslinked. It is especially preferable when the matrix polymers have been three-dimensionally crosslinked.

Epoxy resins may be cationically intracrosslinked. In addition, it is also possible to use acids/anhydrides, amines, hydroxyalkyl amides and thiols as crosslinkers. Silicones can be crosslinked either as one-component systems through condensation in the presence of water (and optionally under Brønsted acid catalysis) or as two-component systems by addition of silicic ester or organotin compounds. Hydrosilylation in vinyl-silane systems is also possible.

Unsaturated compounds, for example acryloyl-functional polymers or unsaturated esters, can be crosslinked with amines or thiols. Cationic vinyl ether polymerization is also possible.

However, it is especially preferable when the matrix polymers are crosslinked, preferably three-dimensionally crosslinked, and very particularly preferably are three-dimensionally crosslinked polyurethanes.

Polyurethane matrix polymers are obtainable in particular by reaction of at least one polyisocyanate component a) with at least one isocyanate-reactive component b).

The polyisocyanate component a) comprises at least one organic compound having at least two NCO groups. These organic compounds may in particular be monomeric di- and triisocyanates, polyisocyanates and/or NCO-functional prepolymers. The polyisocyanate component a) may also contain or consist of mixtures of monomeric di- and triisocyanates, polyisocyanates and/or NCO-functional prepolymers.

Employable monomeric di- and triisocyanates include all of the compounds or mixtures thereof well known per se to the person skilled in the art. These compounds may have aromatic, araliphatic, aliphatic or cycloaliphatic structures. In minor amounts the monomeric di- and triisocyanates may also comprise monoisocyanates, i.e. organic compounds having one NCO group.

Examples of suitable monomeric di- and triisocyanates are butane 1,4-diisocyanate, pentane 1,5-diisocyanate, hexane 1,6-diisocyanate (hexamethylene diisocyanate, HDI), 2,2,4-trimethylhexamethylene diisocyanate and/or 2,4,4-trimethylhexamethylene diisocyanate (TMDI), isophorone diisocyanate (IPDI), 1,8-diisocyanato-4-(isocyanatomethyl)octane, bis(4,4'-isocyanatocyclohexyl)methane and/or bis(2,4-isocyanatocyclohexyl)methane and/or mixtures thereof with any isomer content, cyclohexane 1,4-diisocyanate, the isomeric bis(isocyanatomethyl)cyclohexanes, 2,4- and/or 2,6-diisocyanato-1-methylcyclohexane (hexahydrotolylene 2,4- and/or 2,6-diisocyanate, H6-TDI), phenylene 1,4-diisocyanate, tolylene 2,4- and/or 2,6-diisocyanate (TDI), naphthylene 1,5-diisocyanate (NDI), diphenylmethane 2,4'- and/or 4,4'-diisocyanate (MDI), 1,3-bis(isocyanatomethyl)benzene (XDI) and/or the analogous 1,4 isomer, or any desired mixtures of the aforementioned compounds.

Suitable polyisocyanates are compounds which have urethane, urea, carbodiimide, acylurea, amide, isocyanurate, allophanate, biuret, oxadiazinetrione, uretdione and/or iminooxadiazinedione structures and are obtainable from the aforementioned di- or triisocyanates.

It is particularly preferable when the polyisocyanates are oligomerized aliphatic and/or cycloaliphatic di- or triisocyanates, the abovementioned aliphatic and/or cycloaliphatic di- or triisocyanates in particular being employable.

Very particular preference is given to polyisocyanates having isocyanurate, uretdione and/or iminooxadiazinedione structures and also to biurets based on HDI or mixtures thereof.

Suitable prepolymers contain urethane and/or urea groups, and optionally further structures formed through modification of NCO groups as recited above. Such prepolymers are obtainable for example by reaction of the abovementioned monomeric di- and triisocyanates and/or polyisocyanates a1) with isocyanate-reactive compounds b1).

Employable isocyanate-reactive compounds b1) include alcohols or amino or mercapto compounds, preferably alcohols. These may in particular be polyols. Very particularly preferably employable as isocyanate-reactive compound b1) are polyester polyols, polyether polyols, polycarbonate polyols, poly(meth)acrylate polyols and/or polyurethane polyols.

Suitable polyester polyols are, for example, linear polyester diols or branched polyester polyols which can be obtained in a known manner by reacting aliphatic, cycloaliphatic or aromatic di- or polycarboxylic acids or the anhydrides thereof with polyhydric alcohols of OH functionality ≥2. Examples of suitable di- or polycarboxylic acids are polybasic carboxylic acids such as succinic acid, adipic acid, suberic acid, sebacic acid, decanedicarboxylic acid, phthalic acid, terephthalic acid, isophthalic acid, tetrahydrophthalic acid or trimellitic acid, and acid anhydrides such as phthalic anhydride, trimellitic anhydride or succinic anhydride, or any desired mixtures thereof.

The polyester polyols may also be based on natural raw materials such as castor oil. It is likewise possible that the polyester polyols are based on homo- or copolymers of lactones which are preferably obtainable by addition of lactones or lactone mixtures such as butyrolactone, ε-caprolactone and/or methyl-ε-caprolactone onto hydroxyl-functional compounds such as polyhydric alcohols of OH functionality ≥2, for example of the kind recited below.

Examples of suitable alcohols are all polyhydric alcohols, for example the $C_2$-$C_{12}$ diols, the isomeric cyclohexanediols, glycerol or any desired mixtures thereof with one another.

Suitable polycarbonate polyols are obtainable in a manner known per se by reacting organic carbonates or phosgene with diols or diol mixtures.

Suitable organic carbonates are dimethyl carbonate, diethyl carbonate and diphenyl carbonate.

Suitable diols or mixtures comprise the polyhydric alcohols of OH functionality ≥2 mentioned per se in the context of the polyester segments, preferably butane-1,4-diol, hexane-1,6-diol and/or 3-methylpentanediol. It is also possible to transform polyester polyols to polycarbonate polyols.

Suitable polyether polyols are polyaddition products, optionally of blockwise construction, of cyclic ethers onto OH- or NH-functional starter molecules.

Suitable cyclic ethers are, for example, styrene oxides, ethylene oxide, propylene oxide, tetrahydrofuran, butylene oxide, epichlorohydrin and any desired mixtures thereof.

Starters used may be the polyhydric alcohols of OH functionality ≥2 mentioned per se in the context of the polyester polyols, and also primary or secondary amines and amino alcohols.

Preferred polyether polyols are those of the aforementioned type based exclusively on propylene oxide, or random or block copolymers based on propylene oxide with further 1-alkylene oxides. Particular preference is given to propylene oxide homopolymers and random or block copolymers having oxyethylene, oxypropylene and/or oxybutylene units, where the proportion of the oxypropylene units based on the total amount of all oxyethylene, oxypropylene and oxybutylene units makes up at least 20% by weight, preferably at least 45% by weight. Oxypropylene and oxybutylene here include all respective linear and branched $C_3$ and $C_4$ isomers.

In addition, suitable constituents of the polyol component b1), as polyfunctional isocyanate-reactive compounds, are also aliphatic, araliphatic or cycloaliphatic di-, tri- or polyfunctional alcohols of low molecular weight, i.e. having molecular weights of ≤500 g/mol, and having short chains, i.e. containing 2 to 20 carbon atoms.

These may be, for example, in addition to the abovementioned compounds, neopentyl glycol, 2-ethyl-2-butylpropanediol, trimethylpentanediol, positionally isomeric diethyloctanediols, cyclohexanediol, cyclohexane-1,4-dimethanol, hexane-1,6-diol, cyclohexane-1,2- and -1,4-diol, hydrogenated bisphenol A, 2,2-bis(4-hydroxycyclohexyl)propane or 2,2-dimethyl-3-hydroxypropionic acid, 2,2-dimethyl-3-hydroxypropyl esters. Examples of suitable triols are trimethylolethane, trimethylolpropane or glycerol. Suitable higher-functionality alcohols are di(trimethylolpropane), pentaerythritol, dipentaerythritol or sorbitol.

It is particularly preferred when the polyol component is a difunctional polyether or polyester or a polyether-polyester block copolyester or a polyether-polyester block copolymer with primary OH functions.

It is likewise possible to use amines as isocyanate-reactive compounds b1). Examples of suitable amines are ethylenediamine, propylenediamine, diaminocyclohexane, 4,4'-dicyclohexylmethanediamine, isophoronediamine (IPDA), difunctional polyamines, for example the Jeffamines®, amine-terminated polymers, especially having number-average molar masses ≤10 000 g/mol. Mixtures of the aforementioned amines may likewise be used.

It is likewise possible to use amino alcohols as isocyanate-reactive compounds b1). Examples of suitable amino alcohols are the isomeric aminoethanols, the isomeric aminopropanols, the isomeric aminobutanols and the isomeric aminohexanols or any desired mixtures thereof.

All the aforementioned isocyanate-reactive compounds b1) can be mixed with one another as desired.

It is also preferable when the isocyanate-reactive compounds b1) have a number-average molar mass of ≥200 and ≤10 000 g/mol, more preferably ≥500 and ≤8000 g/mol and very particularly preferably ≥800 and ≤5000 g/mol. The OH functionality of the polyols is preferably 1.5 to 6.0, particularly preferably 1.8 to 4.0.

The prepolymers of the polyisocyanate component a) may especially have a residual content of free monomeric di- and triisocyanates of <1% by weight, particularly preferably <0.5% by weight and very particularly preferably <0.3% by weight.

It may also be possible for the polyisocyanate component a) to contain, in full or in part, an organic compound wherein the NCO groups have been fully or partly reacted with blocking agents known from coating technology. Examples of blocking agents are alcohols, lactams, oximes, malonic esters, pyrazoles, and amines, for example butanone oxime, diisopropylamine, diethyl malonate, ethyl acetoacetate, 3,5-dimethylpyrazole, s-caprolactam, or mixtures thereof.

It is particularly preferable when the polyisocyanate component a) comprises compounds having aliphatically bonded NCO groups, where aliphatically bonded NCO groups are understood to mean those groups bonded to a primary carbon atom. The isocyanate-reactive component b) preferably comprises at least one organic compound having an average of at least 1.5 and preferably 2 to 3 isocyanate-reactive groups. In the context of the present invention, isocyanate-reactive groups are preferably considered to be hydroxyl, amino or mercapto groups.

The isocyanate-reactive component may especially comprise compounds having a numerical average of at least 1.5 and preferably 2 to 3 isocyanate-reactive groups.

Suitable polyfunctional isocyanate-reactive compounds of component b) are, for example, the above-described compounds b1).

Photoinitiators suitable according to the invention are typically compounds which are activatable by actinic radiation and can initiate polymerization of the writing monomers. In the case of the photoinitiators, a distinction can be made between unimolecular (type I) and bimolecular (type II) initiators. In addition, they are distinguished by their chemical nature in photoinitiators for free-radical, anionic, cationic or mixed types of polymerization.

Type I photoinitiators (Norrish type I) for free-radical photopolymerization form free radicals on irradiation through unimolecular bond scission. Examples of type I photoinitiators are triazines, oximes, benzoin ethers, benzil ketals, bisimidazoles, aroylphosphine oxides, sulfonium salts and iodonium salts.

Type II photoinitiators (Norrish type II) for free-radical polymerization consist of a dye sensitizer and a coinitiator, and undergo a bimolecular reaction on irradiation with light attuned to the dye. The dye at first absorbs a photon and transmits energy to the coinitiator from an excited state. The latter releases the polymerization-initiating free radicals through electron or proton transfer or direct hydrogen abstraction.

In the context of this invention, preference is given to using type II photoinitiators.

The dye and the coinitiator of the type II photoinitiators may either be directly mixed conjointly with the further components of the photopolymer or alternatively be singly premixed with individual components. Especially when the photopolymer is to contain polyurethane matrix polymers, the dye may be premixed with the isocyanate-reactive component and the coinitiator with the isocyanate component. However, it is likewise also possible to premix the coinitiator with the isocyanate-reactive component and the dye with the isocyanate component.

Such photoinitiator systems are described in principle in EP 0 223 587 A and preferably consist of a mixture of one or more dyes with ammonium alkylarylborate(s).

Suitable dyes which, together with an ammonium alkylarylborate, form a type II photoinitiator are the cationic dyes described in WO 2012062655 in combination with the anions likewise described therein.

Suitable ammonium alkylarylborates are for example (Cunningham et al., RadTech'98 North America UV/EB Conference Proceedings, Chicago, Apr. 19-22, 1998): tetrabutylammonium triphenylhexylborate, tetrabutylammonium triphenylbutylborate, tetrabutylammonium trinaphthylhexylborate, tetrabutylammonium tris(4-tert-butyl)phenylbutylborate, tetrabutylammonium tris(3-fluorophenyl)hexylborate ([191726-69-9], CGI 7460, product from BASF SE, Basle, Switzerland), 1-methyl-3-octylimidazolium dipentyldiphenylborate and tetrabutylammonium tris(3-chloro-4-methylphenyl)hexylborate ([1147315-11-4], CGI 909, product from BASF SE, Basic, Switzerland).

It may be advantageous to use mixtures of these photoinitiators. According to the radiation source used, the type and concentration of photoinitiator has to be adjusted in the manner known to those skilled in the art. Further details are described, for example, in P. K. T. Oldring (Ed.), Chemistry & Technology of UV & EB Formulations For Coatings, Inks & Paints, Vol. 3, 1991, SITA Technology, London, p. 61-328.

It is very particularly preferable when the photoinitiator comprises a combination of dyes whose absorption spectra at least partly cover the spectral range from 400 to 800 nm with at least one coinitiator attuned to the dyes.

It is also preferable when at least one photoinitiator suitable for a laser light colour selected from blue, green and red is present in the photopolymer formulation.

It is also more preferable when the photopolymer formulation contains a suitable photoinitiator for each of at least two laser light colours selected from blue, green and red.

Finally, it is very particularly preferable when the photopolymer formulation contains a suitable photoinitiator for each of the laser light colours blue, green and red.

A further preferred embodiment provides that the writing monomers comprise a mono- and/or a multifunctional (meth)acrylate writing monomer. The writing monomers may very particularly preferably further comprise at least one mono- and/or one multifunctional urethane (meth)acrylate.

Suitable acrylate writing monomers are in particular compounds of general formula (VIII)

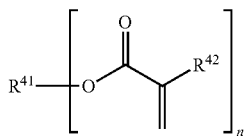

(VIII)

where n≥1 and n≤4 and $R^{41}$ is a linear, branched, cyclic or heterocyclic unsubstituted or else optionally heteroatom-substituted organic radical and/or $R^{42}$ is hydrogen, a linear, branched, cyclic or heterocyclic unsubstituted or else optionally heteroatom-substituted organic radical. It is particularly preferable when $R^{42}$ is hydrogen or methyl and/or $R^{41}$ is a linear, branched, cyclic or heterocyclic unsubstituted or else optionally heteroatom-substituted organic radical.

Acrylates and methacrylates refer in the present context, respectively, to esters of acrylic acid and methacrylic acid. Examples of acrylates and methacrylates usable with preference are phenyl acrylate, phenyl methacrylate, phenoxyethyl acrylate, phenoxyethyl methacrylate, phenoxyethoxyethyl acrylate, phenoxyethoxyethyl methacrylate, phenylthioethyl acrylate, phenylthioethyl methacrylate, 2-naphthyl acrylate, 2-naphthyl methacrylate, 1,4-bis(2-thionaphthyl)-2-butyl acrylate, 1,4-bis(2-thionaphthyl)-2-butyl methacrylate, bisphenol A diacrylate, bisphenol A dimethacrylate, and the ethoxylated analogue compounds thereof, N-carbazolyl acrylates.

Urethane acrylates are understood in the present context to mean compounds having at least one acrylic ester group and at least one urethane bond. Such compounds can be obtained, for example, by reacting a hydroxy-functional acrylate or methacrylate with an isocyanate-functional compound.

Examples of isocyanate-functional compounds usable for this purpose are monoisocyanates, and the monomeric diisocyanates, triisocyanates and/or polyisocyanates mentioned under a). Examples of suitable monoisocyanates are phenyl isocyanate, the isomeric methylthiophenyl isocyanates. Di-, tri- or polyisocyanates are mentioned above as are triphenylmethane 4,4',4"-triisocyanate and tris(p-isocyanatophenyl) thiophosphate or derivatives thereof having a urethane, urea, carbodiimide, acylurea, isocyanurate, allophanate, biuret, oxadiazinetrione, uretdione or iminooxadiazinedione structure and mixtures thereof. Preference is given here to aromatic di-, tri- or polyisocyanates.

Useful hydroxy-functional acrylates or methacrylates for the preparation of urethane acrylates include, for example, compounds such as 2-hydroxyethyl (meth)acrylate, polyethylene oxide mono(meth)acrylates, polypropylene oxide mono(meth)acrylates, polyalkylene oxide mono(meth)acrylates, poly(ε-caprolactone) mono(meth)acrylates, for example Tone® M100 (Dow, Schwalbach, Del.), 2-hydroxypropyl (meth)acrylate, 4-hydroxybutyl (meth)acrylate, 3-hydroxy-2,2-dimethylpropyl (meth)acrylate, hydroxypropyl (meth)acrylate, 2-hydroxy-3-phenoxypropyl acrylate, the hydroxy-functional mono-, di- or tetraacrylates of polyhydric alcohols such as trimethylolpropane, glycerol, pentaerythritol, dipentaerythritol, ethoxylated, propoxylated or alkoxylated trimethylolpropane, glycerol, pentaerythritol, dipentaerythritol or the technical grade mixtures thereof.

Preference is given to 2-hydroxyethyl acrylate, hydroxypropyl acrylate, 4-hydroxybutyl acrylate and poly(ε-caprolactone) mono(meth)acrylate.

It is likewise possible to use the known-per-se hydroxyl-containing epoxy (meth)acrylates having OH contents of 20 to 300 mg KOH/g or hydroxyl-containing polyurethane (meth)acrylates having OH contents of 20 to 300 mg KOH/g or acrylated polyacrylates having OH contents of 20 to 300 mg KOH/g and mixtures of these with one another, and mixtures with hydroxyl-containing unsaturated polyesters and mixtures with polyester (meth)acrylates or mixtures of hydroxyl-containing unsaturated polyesters with polyester (meth)acrylates.

Preference is given in particular to urethane acrylates obtainable from the reaction of tris(p-isocyanatophenyl) thiophosphate and/or m-methylthiophenyl isocyanate with alcohol-functional acrylates such as hydroxyethyl (meth)acrylate, hydroxypropyl (meth)acrylate and/or hydroxybutyl (meth)acrylate.

It is likewise possible that the writing monomer comprises further unsaturated compounds such as α,β-unsaturated carboxylic acid derivatives, for example maleates, fumarates, maleimides, acrylamides, and also vinyl ethers, propenyl ethers, allyl ethers and compounds containing dicyclopentadienyl units, and also olefinically unsaturated compounds, for example styrene, α-methylstyrene, vinyltoluene and/or olefins.

In a further preferred embodiment, the photopolymer formulation additionally contains monomeric urethanes as additives, in which case the urethanes may especially be substituted by at least one fluorine atom.

The urethanes may preferably have the general formula (IX)

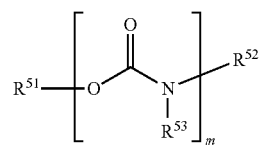

(IX)

in which m≥1 and m≤8 and $R^{51}$, $R^{52}$ and $R^{53}$ are linear, branched, cyclic or heterocyclic unsubstituted or else optionally heteroatom-substituted organic radicals and/or $R^{52}$, $R^{53}$ are independently of one another hydrogen, wherein preferably at least one of the radicals $R^{51}$, $R^{52}$, $R^{53}$ is substituted by at least one fluorine atom and particularly preferably $R^{51}$ is an organic radical having at least one fluorine atom. It is particularly preferable when $R^{52}$ is a linear, branched, cyclic or heterocyclic organic radical which is unsubstituted or else optionally substituted with heteroatoms, for example fluorine.

In a further preferred embodiment of the invention, the photopolymer contains 10% to 89.999% by weight, preferably 20% to 70% by weight, of matrix polymers, 3% to 60% by weight, preferably 10% to 50% by weight, of writing monomers, 0.001% to 5% by weight, preferably 0.5% to 3% by weight, of photoinitiators and optionally 0% to 4% by weight, preferably 0% to 2% by weight, of catalysts, 0% to 5% by weight, preferably 0.001% to 1% by weight, of stabilizers, 0% to 40% by weight, preferably 10% to 30% by weight, of monomeric fluorourethanes and 0% to 5% by weight, preferably 0.1% to 5% by weight, of further additives, wherein the sum of all constituents is 100% by weight.

Particular preference is given to using photopolymers comprising 20% to 70% by weight of matrix polymers, 20% to 50% by weight of writing monomers, 0.001% to 5% by weight of photoinitiators, 0% to 2% by weight of catalysts, 0.001% to 1% by weight of free-radical stabilizers, optionally 10% to 30% by weight of fluorourethanes and optionally 0.1% to 5% by weight of further additives.

Employable catalysts include urethanization catalysts, for example organic or inorganic derivatives of bismuth, of tin, of zinc or of iron (see also the compounds specified in US 2012/062658). Particularly preferred catalysts are butyltin tris(2-ethylhexanoate), iron(III) trisacetylacetonate, bismuth (III) tris(2-ethylhexanoate) and tin(II) bis(2-ethylhexanoate). In addition, it is also possible to use sterically hindered amines as catalysts.

Employable stabilizers include free-radical inhibitors such as HALS amines, N-alkyl HALS, N-alkoxy HALS and N-alkoxyethyl HALS compounds, and also antioxidants and/or UV absorbers.

Employable further additives include levelling assistants and/or antistats and/or thixotropic agents and/or thickeners and/or biocides.

Protective Layer C

Before curing with actinic radiation the latent protective layer C comprises a physically drying polymer resin, an acrylic functional reactive diluent and a photoinitiator. It is preferable when the latent protective layer C additionally comprises a UV absorber in an amount of 0.01% to 10% by weight, more preferably in an amount of 0.1% to 5% by weight, in each case based on the total weight of the protective layer C.

It is preferable when the protective layer C has a thickness of 1 to 100 µm, preferably of 2 to 50 µm and very particularly preferably of 3 to 25 µm.

The physically drying resins are selected from the group consisting of polyvinylbutyral with $M_w \geq 100\,000$ g/mol or amorphous polymethyl methacrylate with $M_w \geq 10\,000\,000\,000$ g/mol and preferably have a glass transition temperature between −20° C. and 190° C. They may be dissolved in suitable solvents. The amorphous polymethyl methacrylate with $M_w \geq 100\,000$ g/mol is for example Degalan M345, Degalan M920, Degacryl M547, Degacryl M727, Degacryl MW730 or Degacryl 6962 F, from Evonik Industries AG, Marl, Germany. A polyvinyl butyral with $M_w \geq 100\,000$ g/mol is for example Mowital B75H from Kuraray Europe GmbH, Hattersheim, Germany.

The reactive diluent preferably contains or consists of one or more radiation-curable compounds comprising at least two, preferably at least three, radiation-curable, free-radically polymerizable groups per molecule, preferably acrylic and/or methacrylic groups and very particularly preferably acrylic groups.

Furthermore, the abovementioned acrylic esters may also be employed as analogous methacrylic esters. Also possible are mixtures of the recited acrylates with one another and of the analogous methacrylates with one another and mixtures of acrylates and methacrylates.

In one embodiment the at least one reactive diluent is selected from the group consisting of pentoerythritol triacrylate, dipentaerythritol pentaacrylate, dipentaerythrital hexaacrylate compound of formula (Ia)

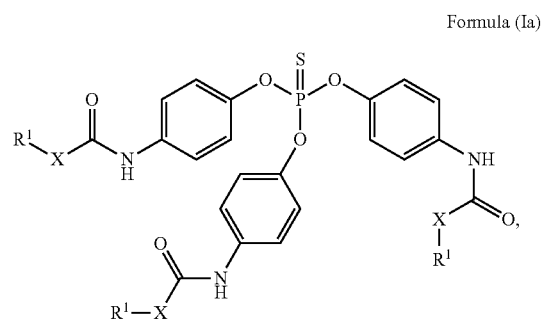

Formula (Ia)

compound of formula (Ib)

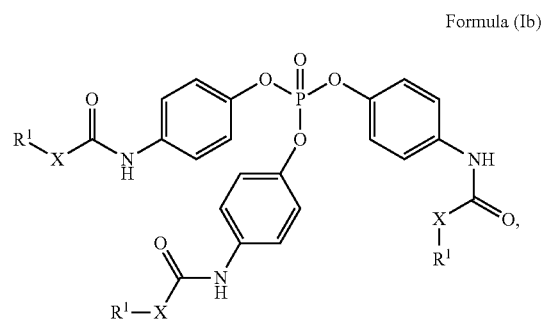

Formula (Ib)

compound of formula (Ic)

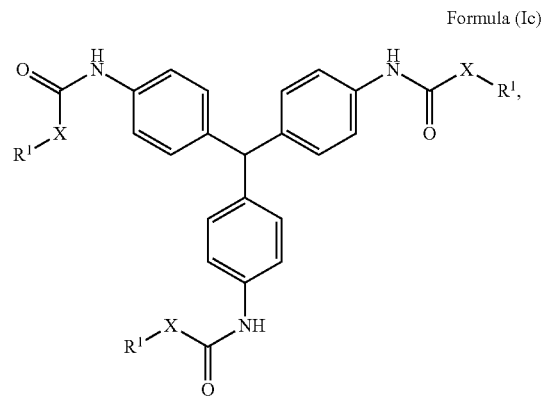

Formula (Ic)

wherein in formulae (Ia) to (Ic)

$R^1$ is independently at each occurrence a radiation-curable group and

X is independently at each occurrence a single bond between $R^1$ and C=O or a linear, branched or cyclic optionally heteroatom-containing and/or optionally functional-group-substituted hydrocarbon radical, compound of formula (II)

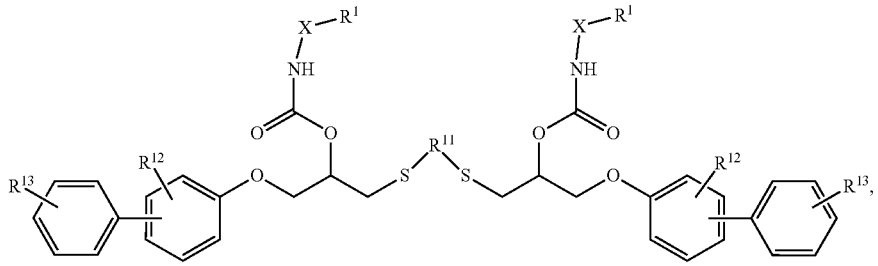

Formula (II)

wherein in formula (II)

$R^1$ and X are as defined in formula (Ia)-(Ic), $R^{11}$ is a linear or branched, optionally heteroatom-substituted aliphatic, aromatic or araliphatic radical, $R^{12}$ is independently at each occurrence up to four substituents selected from methyl, ethyl, propyl, n-butyl, tert-butyl, chlorine, bromine, iodine, methylthio, phenyl and/or phenylthio, $R^{13}$ is independently at each occurrence up to five substituents selected from methyl, ethyl, propyl, n-butyl, tert-butyl, chlorine, bromine, iodine, methylthio, phenyl and/or phenylthio, compound of formula (III)

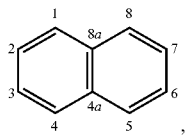

Formula (III)

i) which is substituted at at least one of the carbon atoms 1, 2, 3, 4, 5, 6, 7, 8 with an $R_{acryl}$ radical of formula (IV),

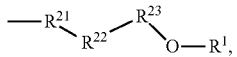

Formula (IV)

wherein in formula (IV)

$R^1$ is as defined in formula (Ia)-(Ic), $R^{21}$ is oxygen or sulfur, $R^{22}$ is a carboxamide (—C(O)N—) or a carboxylic ester (—C(O)O—) or a sulfonamide (—SO$_2$N—) group, $R^{23}$ is a saturated or unsaturated or linear or branched optionally substituted radical comprising 2-10 carbon atoms or a polyether comprising up to five (—CH$_2$—CH$_2$—O—)— or (—C(CH$_3$)H—CH$_2$—O—)— groups or a polyamine comprising up to five nitrogen atoms and ii) the compound of formula (III) is at at least one further carbon atom 1, 2, 3, 4, 5, 6, 7, 8 substituted with a radical of formula (V),

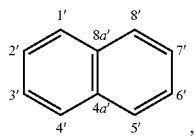

Formula (V)

wherein in formula (V)

the carbon atoms of the compound of formula (V) are each independently substituted with hydrogen, halogen, a cyano group, a nitro group or an optionally substituted alkyl, alkenyl, alkynyl, aralkyl, aryl or heteroaryl group or an optionally substituted alkoxy or alkylthio group or any substituted carbamoyl group, which also may be linked bridgingly to a radical of formula (III), or a trifluoromethyl group or a trifluoromethoxy group or an $R_{acryl'}$ radical of formula (VI),

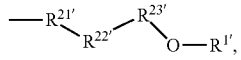

Formula (VI)

wherein in formula (VI)

$R^{1'}$ has the same definition as $R^1$ in formula (IV), $R^{21'}$ is oxygen or sulfur, $R^{22'}$ is a carboxamide (—C(O)N—) or a carboxylic ester (—C(O)O—) or a sulfonamide (—SO$_2$N—) group, $R^{23'}$ is a saturated or unsaturated or linear or branched optionally substituted radical comprising 2-10 carbon atoms or a polyether comprising up to five (—CH$_2$—CH$_2$—O—)— or (—C(CH$_3$)H—CH$_2$—O—)— groups or a polyamine comprising up to five nitrogen atoms, iii) the remaining carbon atoms of the compound of formula (III) are each independently substituted with hydrogen, halogen, a cyano group, a nitro group or an optionally substituted alkyl, alkenyl, alkynyl, aralkyl, aryl or heteroaryl group or an optionally substituted alkoxy or alkylthio group or a trifluoromethyl group or a trifluoromethoxy group, and compound of formula (VII)

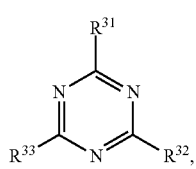

(VII)

wherein in formula (VII)

$R^{31}$, $R^{32}$, $R^{33}$ are each independently of one another OH, halogen or an organic radical, wherein at least one of the radicals is an organic radical comprising a radiation-curable group.

It is preferable when the at least one reactive diluent is selected from the group consisting of pentaerythritol triacrylate, dipentaerythritol pentaacrylate, dipentaerythrital hexaacrylate, compound of formula (Ia)

Formula (Ia)

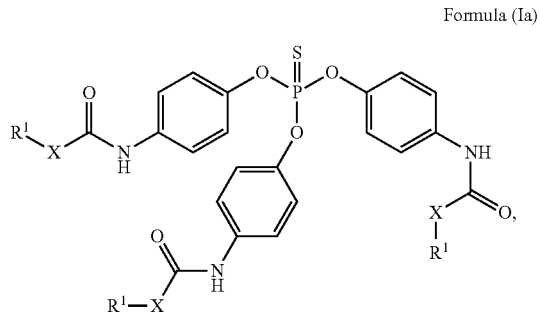

compound of formula (Ib)

Formula (Ib)

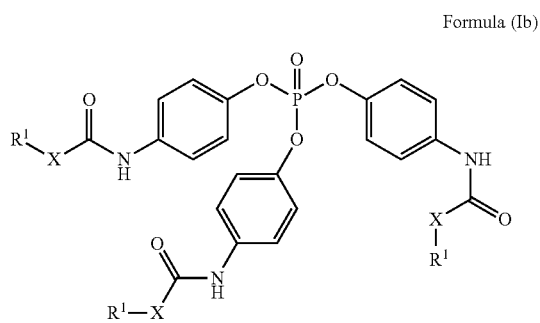

compound of formula (Ic)

Formula (Ic)

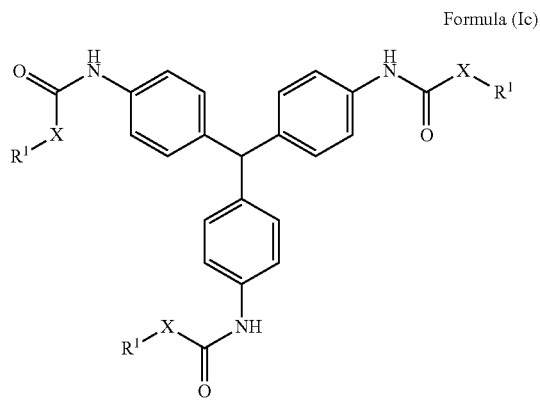

wherein the formulae (Ia) to (Ic)

$R^1$ is independently at each occurrence a radiation-curable group and

X is independently at each occurrence a single bond between $R^1$ and C=O or a linear, branched or cyclic optionally heteroatom-containing and/or optionally functional-group-substituted hydrocarbon radical, preferably independently at each occurrence a linear, branched or cyclic optionally heteroatom-containing and/or optionally functional-group-substituted hydrocarbon radical.

It is particularly preferable when the at least one reactive diluent is pentaerythritol triacrylate, a compound of formula (Ia) and/or mixtures thereof, yet more preferably a compound of formula (Ia).

It is preferable when $R^1$ in formula (Ia)-(Ic) is a vinyl ether, acrylate or methacrylate group, particularly preferably an acrylate group.

One or more of the carbon-bonded hydrogen atoms of the group $R^1$ may in principle also be substituted by $C_1$- to $C_5$-alkyl groups, though this is not preferred.

It is preferable when the group X in formula (Ia)-(Ic) comprises 2 to 40 carbon atoms and one or more oxygen atoms present in the form of ether bridges. X may be either linear or branched or cyclic and also substituted by functional groups. It is particularly preferable when the group X is at each occurrence a linear or branched oxyalkylene or polyoxyalkylene group.

Preferred polyoxyalkylene groups comprise up to 10, preferably up to 8, repeating units of the respective oxyalkylene group.

It is in principle possible for X in formula (Ia)-(Ic) to comprise identical or different oxyalkylene groups as repeating units, wherein such a repeating unit preferably comprises 2 to 6, particularly preferably 2 to 4, carbon atoms. Particularly preferred oxyalkylene units are oxyethylene and the respective isomeric oxypropylenes or oxybutylenes.

The repeating units within the respective group X may have a full or partial blockwise or statistical distribution.

In a preferred embodiment of the invention X is independently at each occurrence an oxyalkylene unit selected from the group consisting of —$CH_2$—$CH_2$—O—, —$CH_2$—$CHCH_3$-O—, —$CHCH_3$—$CH_2$—O—, —($CH_2$—$CH_2$-O)$_n$—, —O($CH_2$—$CHCH_3$-O)$_n$—, wherein n is an integer from 2 to 7, and —O—$CH_2$—$CH_2$-(O—($CH_2$)$_5$-CO)$_m$—, wherein m is an integer from 1 to 5.

The compounds according to formula (Ia)-(Ic) may be prepared as disclosed in WO2015091427A1.

In a further embodiment the reactive diluent is a compound of formula (II)

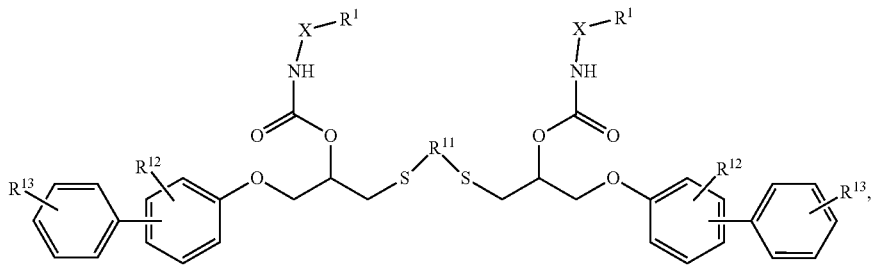

Formula (II)

wherein in formula (II)

$R^1$ and X is as defined in formula (Ia)-(Ic), $R^{11}$ is a linear or branched, optionally heteroatom-substituted aliphatic, aromatic or araliphatic radical, $R^{12}$ is independently at each occurrence up to four substituents selected from methyl, ethyl, propyl, n-butyl, tert-butyl, chlorine, bromine, iodine, methylthio, phenyl and/or phenylthio, $R^{13}$ is independently at each occurrence up to five substituents selected from methyl, ethyl, propyl, n-butyl, tert-butyl, chlorine, bromine, iodine, methylthio, phenyl and/or phenylthio.

The compounds according to formula (II) may be prepared as disclosed in WO2012/020061 A1.

In a first preferred embodiment $R^{11}$ in formula (II) is a linear or branched aliphatic, aromatic or araliphatic radical comprising 2 to 22 carbon atoms and preferably substituted with one or more oxygen, nitrogen and/or sulfur atoms. It is more preferable when $R^{11}$ comprises 2 to 16 carbon, 0 to 4 oxygen, 0 to 1 nitrogen and 0 to 1 sulfur atoms. It is also possible for $R^{11}$ in formula (II) to comprise at least one functional group selected from the group of ether (—O—), thioether (—S—), ester (—O—CO), urethane (NH—CO). In this case $R^{11}$ may therefore in particular be linear or branched, optionally heteroatom-substituted aliphatic, aromatic or araliphatic ethers, thioethers, esters or urethanes, wherein these compounds may in turn preferably have an aliphatic nature.

It is very particularly preferable when $R^{11}$ in formula (II) is $(CH_2)_l$ where l=2 to 10, $(CH_2CH_2—O)_m—CH_2—CH_2$ where m=1 or 2, $CH(CH_3)—CH(CH_3)$, $CH_2—CO—OCH_2—CH_2—O—CO—CH_2$, phenylene-S-phenylene and/or $CH_2—CH(CH_2—O—CO—NH$-phenylene-S-phenyl).

Also preferred are compounds of formula (II) where the radiation-curable group is acrylate.

The substituents $R^{12}$ and $R^{13}$ in formula (II) may each independently of one another be H, methyl, phenyl, methylthio or phenylthio and preferably hydrogen.

In a further embodiment the reactive diluent is a compound of formula (III)

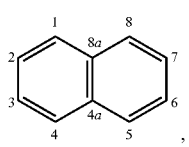

Formula (III)

i) which is substituted at at least one of the carbon atoms 1, 2, 3, 4, 5, 6, 7, 8 with an $R_{acryl}$ radical of formula (IV),

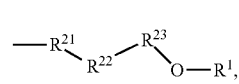

Formula (IV)

wherein in formula (IV)

$R^1$ is as defined in formula (Ia)-(Ic), $R^{21}$ is oxygen or sulfur.

$R^{22}$ is a carboxamide (—C(O)N—) or a carboxylic ester (—C(O)O—) or a sulfonamide (—SO$_2$N—) group, $R^{23}$ is a saturated or unsaturated or linear or branched optionally substituted radical comprising 2-10 carbon atoms or a polyether comprising up to five (—CH$_2$—CH$_2$—O—)— or (—C(CH$_3$)H—CH$_2$—O—)— groups or a polyamine comprising up to five nitrogen atoms and ii) the compound of formula (III) is at at least one further carbon atom 1, 2, 3, 4, 5, 6, 7, 8 substituted with a radical of formula (V),

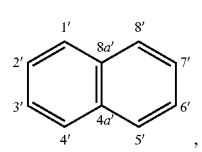

Formula (V)

wherein in formula (V)

the carbon atoms of the compound of formula (V) am each independently substituted with hydrogen, halogen, a cyano group, a nitro group or an optionally substituted alkyl, alkenyl, alkynyl, aralkyl, aryl or heteroaryl group or an optionally substituted alkoxy or alkylthio group or any substituted carbamoyl group, which also may be linked bridgingly to a radical of formula (III), or a trifluoromethyl group or a trifluoromethoxy group or an $R_{acryl'}$ radical of formula (VI),

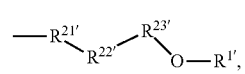

Formula (VI)

wherein in formula (VI)
R$^{1'}$ has the same definition as R$^1$ in formula (IV),
R$^{21'}$ is oxygen or sulfur,
R$^{22'}$ is a carboxamide (—C(O)N—) or a carboxylic ester (—C(O)O—) or a sulfonamide (—SO$_2$N—) group,
R$^{23'}$ is a saturated or unsaturated or linear or branched optionally substituted radical comprising 2-10 carbon atoms or a polyether comprising up to five (—CH$_2$—CH$_2$—O—)— or (—C(CH$_3$)H—CH$_2$—O—)— groups or a polyamine comprising up to five nitrogen atoms,
iii) the remaining carbon atoms of the compound of formula (III) are each independently substituted with hydrogen, halogen, a cyano group, a nitro group or an optionally substituted alkyl, alkenyl, alkynyl, aralkyl, aryl or heteroaryl group or an optionally substituted alkoxy or alkylthio group or a trifluoromethyl group or a trifluoromethoxy group.

The compounds according to formula (III) may be prepared as disclosed in WO2016/091965 A1.

It is preferable when the compounds of formula (III) are substituted at the carbon atom of position 5 in formula (III) with the radical of formula (V), wherein the radical of formula (V) may preferably be bonded via the carbon atom of position 8' to the carbon atom of position 5.

It is likewise preferable when the compound is substituted at the carbon atom of position 6 in formula (III) with the radical R$_{acryl}$ of formula (IV).

It is also advantageous when the radical of formula (V) is substituted at the carbon atom of position 7' with the radical R$_{acryl'}$ of formula (VI).

It is preferable when in the radical R$_{acryl}$ R$^{22}$ represents carboxamide and/or in the radical R$_{acryl'}$ R$^{22'}$ represents carboxamide.

It is also furthermore advantageous when in the radical R$_{acryl}$ R$^1$ represents acrylates or methacrylates and/or in the radical R$_{acryl'}$ R$^{1'}$ represents acrylates or methacrylates.

Furthermore, in the radical R$_{acryl}$ R$^{23}$ may preferably be a —CH$_2$—CH$_2$— radical and/or in the radical R$_{acryl'}$ R$^{23'}$ may preferably be a —CH$_2$—CH$_2$— radical.

It is also preferable when R$^{21}$ and/or R$^{21'}$ is oxygen.

It is very particularly preferable when R$^{21}$ and/or R$^{21'}$ is oxygen and R$^{22}$ and/or R$^{22'}$ is a carboxamide group.

It is especially preferable when the inventive compound of formula (III) is selected from the group of the following substances: 2-[({[2'-({[2-(acryloyloxy)ethyl]carbamoyl}oxy)-1,1'-binaphthyl-2-yl]oxy}carbonyl)amino]ethyl methacrylate, dimethyl 2,2'-bis({[2-(methacryloyloxy)ethyl]carbamoyl}oxy)-1,1'-binaphthyl-3,3'-dicarboxylate, diethyl 2,2'-bis({[2-(methacryloyloxy)ethyl]carbamoyl}oxy)-1,1'-binaphthyl-3,3'-dicarboxylate, 1,1'-binaphthyl-2,2'-diylbis(oxycarbonyliminoethane-2,1-diyl)bisacrylate, 1,1'-binaphthyl-2,2'-diylbis(oxycarbonyliminoethane-2,1-diyl)bis(2-methylacrylate), (6,6'-dicyano-1,1'-binaphthyl-2,2'-diyl)bis(oxycarbonyliminoethane-2,1-diyl) bisacrylate, (6,6'-difluoro-1,1'-binaphthyl-2,2'-diyl)bis(oxycarbonyliminoethane-2,1-diyl) bisacrylate, (6,6'-dichloro-1,1'-binaphthyl-2,2'-diyl)bis(oxycarbonyliminoethane-2,1-diyl) bisacrylate, (6,6'-dibromo-1,1'-binaphthyl-2,2'-diyl)bis(oxycarbonyliminoethane-2,1-diyl) bisacrylate, (6,6'-diiodo-1,1'-binaphthyl-2,2'-diyl)bis(oxycarbonyliminoethane-2,1-diyl) bisacrylate, difluoro-1,1'-binaphthyl-2,2'-diyl)bis(oxycarbonyliminoethane-2,1-diyl) bis(2-methylacrylate), (6,6'-dichloro-1,1'-binaphthyl-2,2'-diyl)bis(oxycarbonyliminoethane-2,1-diyl) bis(2-methylacrylate), (6,6'-dibromo-1,1'-binaphthyl-2,2'-diyl)bis(oxycarbonyliminoethane-2,1-diyl)bis(2-methylacrylate), (6,6'-diiodo-1,1'-binaphthyl-2,2'-diyl)bis(oxycarbonyliminoethane-2,1-diyl) bis(2-methylacrylate), (7,7'-dimethoxy-1,1'-binaphthyl-2,2'-diyl)bis(oxycarbonyliminoethane-2,1-diyl) bisacrylate, (7,7'-diethoxy-1,1'-binaphthyl-2,2'-diyl)bis(oxycarbonyliminoethane-2,1-diyl) bisacrylate, 2-{[({2'-[(hexylcarbamoyl)oxy]-1,1'-binaphthyl-2-yl}oxy)carbonyl]amino}ethyl acrylate, 2-{[({2'-[(butylcarbamoyl)oxy]-1,1'-binaphthyl-2-yl}oxy)carbonyl] amino}ethyl acrylate, 2-{[({2'-[(hexylcarbamoyl)oxy]-1,1'-binaphthyl-2-yl}oxy)carbonyl]amino}ethyl 2-methylacrylate, 2-{[({2'-[(butylcarbamoyl)oxy]-1,1'-binaphthyl-2-yl}oxy)carbonyl]amino}ethyl 2-methylacrylate, 2-{[({2'-[(hexylcarbamoyl)oxy]-1,1'-binaphthyl-2-yl}oxy)carbonyl] amino}ethyl acrylate, 2-{[({2'-[(hexylcarbamoyl)oxy]-1,1'-binaphthyl-2-yl}oxy)carbonyl]amino}ethyl 2-methylacrylate, 2-{[({2'-[(hexylcarbamoyl)oxy]-1,1'-binaphthyl-2-yl}oxy)carbonyl]amino}ethyl acrylate, 2-{[({2'-[(hexylcarbamoyl)oxy]-1,1'-binaphthyl-2-yl}oxy)carbonyl]amino}ethyl 2-methylacrylate, 2-{[({2'-[(butylcarbamoyl)oxy]-1,1'-binaphthyl-2-yl}oxy)carbonyl]amino}ethyl acrylate, 2-{[({2'-[(butylcarbamoyl)oxy]-1,1'-binaphthyl-2-yl}oxy)carbonyl]amino}ethyl 2-methylacrylate, 2-[({[2'-({[3-(methylsulfanyl)phenyl]carbamoyl}oxy)-1,1'-binaphthyl-2-yl]oxy}carbonyl)amino]ethyl acrylate, 2-[({[2'-({[3-(methylsulfanyl)phenyl]carbamoyl}oxy)-1,1'-binaphthyl-2-yl]oxy}carbonyl)amino]ethyl methacrylate, 2-[({[2'-({[2-(methylsulfanyl)phenyl]carbamoyl}oxy)-1,1'-binaphthyl-2-yl]oxy}carbonyl)amino]ethyl acrylate, 2-[({[2'-({[2-(methylsulfanyl)phenyl]carbamoyl}oxy)-1,1'-binaphthyl-2-yl]oxy}carbonyl)amino]ethyl methacrylate, 2-[({[2'-({[4-(methylsulfanyl)phenyl]carbamoyl}oxy)-1,1'-binaphthyl-2-yl]oxy}carbonyl)amino]ethyl acrylate, 2-[({[2'-({[4-(methylsulfanyl)phenyl]carbamoyl}oxy)-1,1'-binaphthyl-2-yl]oxy}carbonyl)amino]ethyl methacrylate, 2-{[({2'-[(1-naphthylcarbamoyl)oxy]-1,1'-binaphthyl-2-yl}oxy) carbonyl]amino}ethyl acrylate, 2-{[({2'-[(1-naphthylcarbamoyl)oxy]-1,1'-binaphthyl-2-yl}oxy)carbonyl] amino}ethyl methacrylate, hexane-1,6-diylbis(carbamoyloxy-1,1'-binaphthyl-2',2-diyloxycarbonyliminoethane-2,1-diyl) bisacrylate, hexane-1,6-diylbis(carbamoyloxy-1,1'-binaphthyl-2',2-diyloxycarbonyliminoethane-2,1-diyl) bis(2-methylacrylate), (2,2,4-trimethylhexane-1,6-diyl)bis(carbamoyloxy-1,1'-binaphthyl-2',2-diyloxycarbonyliminoethane-2,1-diyl)-bisacrylate, (2,2,4-trimethylhexane-1,6-diyl)bis(carbamoyloxy-1,1'-binaphthyl-2',2-diyloxycarbonyliminoethane-2,1-diyl)-bis(2-methylacrylate), 2-({[(2'-{[(3-{[({[2'-({[2-(acryloyloxy)ethyl]carbamoyl}oxy)-1,1'-binaphthyl-2-yl]oxy}carbonyl)amino]methyl}-3,5,5-trimethylcyclohexyl)carbamoyl]-oxy]-1,1'-binaphthyl-2-yl)oxy]carbonyl}amino)ethyl acrylate, 2-({[(2'-{[(3-{[({[2'-({[2-(methacryloyloxy)ethyl]carbamoyl}oxy)-1,1'-binaphthyl-2-yl]oxy}carbonyl)amino]methyl}-3,5,5-trimethylcyclohexyl)¬carbamoyl]oxy}-1,1'-binaphthyl-2-yl)oxy] carbonyl}amino)ethyl methacrylate), (6-fluoro-1,1'-binaphthyl-2,2'-diyl)bis(oxycarbonyliminoethane-2,1-diyl) bisacrylate, (6-fluoro-1,1'-binaphthyl-2,2'-diyl)bis(oxycarbonyliminoethane-2,1-diyl) bis(2-methylacrylate), (6-chloro-1,1'-binaphthyl-2,2'-diyl)bis(oxycarbonyliminoethane-2,1-diyl) bisacrylate, (6-chloro-1,1'-binaphthyl-2,2'-diyl)bis(oxycarbonyliminoethane-2,1-diyl) bis(2-methylacrylate), (6-bromo-1,1'-binaphthyl-2,2'-diyl)bis(oxycarbonyliminoethane-2,1-diyl) bisacrylate, (6-bromo-1,1'-binaphthyl-2,2'-diyl)bis(oxycarbonyliminoethane-2,1-diyl) bis(2-methylacrylate), (6-iodo-1,1'-binaphthyl-2,2'-diyl)bis(oxycarbonyliminoethane-2,1-diyl) bisacrylate, (6-iodo-1,1'-binaphthyl-2,2'-diyl)bis(oxycarbonyliminoethane-2,1-diyl) bis(2-methylacrylate), (6-cyano-1,1'-binaphthyl-2,2'-diyl)bis(oxycarbonyliminoethane-2,1-diyl) bisacrylate, (6-cyano-1,1'-binaphthyl-2,2'-diyl)bis(oxycarbonyliminoethane-2,1-diyl) bis(2-methylacrylate), (6-fluoro-6'-cyano-1,1'-binaphthyl-2,2'-diyl)bis(oxycarbonyliminoethane-2,1-diyl) bisacrylate, (6-fluoro-6'-cyano-1,1'-binaphthyl-2,2'-diyl)bis(oxycarbonyliminoethane-2,1-diyl) bis(2-methylacrylate), (6-chloro-6'-cyano-1,1'-binaphthyl-2,2'-diyl)bis(oxycarbonyliminoethane-2,1-diyl) bisacrylate, (6-chloro-6'-cyano-1,1'-binaphthyl-2,2'-diyl)bis(oxycarbonyliminoethane-2,1-diyl) bis(2-methylacrylate), (6-bromo-6'-cyano-1,1'-binaphthyl-2,2'-diyl)bis(oxycarbonyliminoethane-2,1-diyl) bisacrylate, (6-bromo-6'-cyano-1,1'-binaphthyl-2,2'-diyl)bis(oxycarbonyliminoethane-2,1-diyl) bis(2-methylacrylate), (6-iodo-6'-cyano-1,1'-binaphthyl-2,2'-diyl)bis(oxycarbonyliminoethane-2,1-diyl) bisacrylate, (6-iodo-6'-cyano-1,1'-binaphthyl-2,2'-diyl)bis(oxycarbonyliminoethane-2,1-diyl) bis(2-methylacrylate).

In a further embodiment the reactive diluent is a compound of formula (VII)

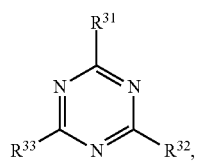

(VII)

wherein in formula (VII)
$R^{31}$, $R^{32}$, $R^{33}$ are each independently of one another OH, halogen or an organic radical, wherein at least one of the radicals is an organic radical comprising a radiation-curable group.

The compounds of formula (VII) may be obtained for example by reaction of the corresponding amines or alcohols with cyanuric chloride. This reaction is an amination/etherification. The reaction may be performed using known catalysts, for example tertiary amines, anilines or nitrogen-containing heterocycles or inorganic bases.

The production of such compounds is described in SU 2006990 (1976) and JP 58004027 for example.

It is preferable when the organic radical(s) of the compound according to formula (VII) are joined to the triazine ring via an oxygen atom or a nitrogen atom.

It is also preferred when the radiation-curable group is an acrylate group or a methacrylate group.

It is preferable when $R^{31}$, $R^{32}$, $R^{33}$ in formula (VII) are independently of one another halogen, substituted or unsubstituted phenol, naphthol, aniline, naphthaline, 2-hydroxyethyl (meth)acrylate, hydroxypropyl (meth)acrylate and/or 4-hydroxybutyl (meth)acrylate radicals, wherein at least one of the radicals $R^{31}$, $R^{32}$, $R^{33}$ is a 2-hydroxyethyl (meth)acrylate, a hydroxypropyl (meth)acrylate or a 4-hydroxybutyl (meth)acrylate radical.

It is more preferable when at least two of the radicals $R^{31}$, $R^{32}$, $R^{33}$ in formula (VII) are each independently of one another a 2-hydroxyethyl (meth)acrylate, a hydroxypropyl (meth)acrylate and/or a 4-hydroxybutyl (meth)acrylate radical.

The employed photoinitiators are typically compounds which are activatable by actinic radiation and can initiate polymerization of the corresponding groups.

Among the photoinitiators a distinction may be made between unimolecular (type I) and bimolecular (type II) initiators for initiating free-radical polymerization; there is extensive prior art concerning this.

Type I photoinitiators (Norrish type I) for free-radical photopolymerization on irradiation form free radicals through unimolecular bond scission.

Examples of type I photoinitiators are triazines, for example tris(trichloromethyl)triazine, oximes, benzoin ethers, benzil ketals, alpha-alpha-dialkoxyacetophenone, phenylglyoxylic esters, bisimidazoles, aroyl phosphinoxides, for example 2,4,6-trimethylbenzoyldiphenylphosphinoxide, sulfonium and iodonium salts.

Type II photoinitiators (Norrish type II) for free-radical polymerization on irradiation undergo a bimolecular reaction, wherein the photoinitiator in the excited state reacts with a second molecule, the coinitiator, and by electron or proton transfer or direct hydrogen abstraction forms the polymerization-initiating free radicals.

Examples of type II photoinitiators are quinones, for example camphorquinone, aromatic keto compounds, for example benzophenones in combination with tertiary amines, alkyl benzophenones, halogenated benzophenones, 4,4'-bis(dimethylamino)benzophenone (Michlers ketone), anthrone, methyl-p-(dimethylamino) benzoate, thioxanthone, ketocoumarins, alpha-aminoalkylphenone, alpha-hydroxyalkylphenone and cationic dyes, for example methylene blue, in combination with tertiary amines.

For the UV and shortwave visible range type I and type II photoinitiators are employed and for the longer wave visible light range predominantly type II photoinitiators are employed.

Preference is given to 1-hydroxycyclohexyl phenyl ketone (e.g. Irgacure® 184 from BASF SE), 2-hydroxy-2-methyl-1-phenyl-1-propanone (e.g. Irgacure® 1173 from BASF SE), 2-hydroxy-1-{4-[4-(2-hydroxy-2-methyl-propionyl)-benzyl]-phenyl}-2-methylpropan-1-one (e.g. Irgacure® 127 from BASF SE), 2-hydroxy-1-[4-(2-hydroxyethoxy)phenyl]-2-methyl-1-propanone (e.g. Irgacure®2959 from BASF SE); 2,4,6-trimethylbenzoyldiphenylphosphine oxides (e.g. Lucirin® TPO from BASF SE); 2,4,6-trimethylbenzoyldiphenyl phosphinates (e.g. Lucirin® TPO-L from BASF SE), bis(2,4,6-trimethylbenzoyl)phenylphosphine oxide (Lucirin® 819); [1-(4-phenylsulfanylbenzoyl)heptylideneamino] benzoate (e.g. Irgacure® OXE 01 from BASF SE); [1-[9-ethyl-6-(2-methylbenzoyl)carbazol-3-yl]ethylideneamino] acetate (e.g. Irgacure® OXE 02 from BASF SE) and mixtures thereof. Particular preference is given to 2-hydroxy-2-methyl-1-phenyl-1-propanone and 2,4,6-trimethylbenzoyldiphenylphosphine oxide and mixtures thereof.

Typical UV absorbers are benzotriazoles, cyanoacrylates, benzophenones, phenyltriazines, hydroxyphenyltrazines or oxalanilides.

Light stabilizers such as phenols or HALS amines may also be present.

In one preferred embodiment the protective layer C comprises
I) at least one thermoplastic resin selected from the group consisting of polyvinyl butyral with $M_w \geq 100\,000$ g/mol or amorphous polymethyl methacrylate with $M_w \geq 100\,000$ g/mol;
II) at least one reactive diluent selected from the group consisting of pentaerythritol triacrylate compound of formula (Ia)

Formula (Ia)

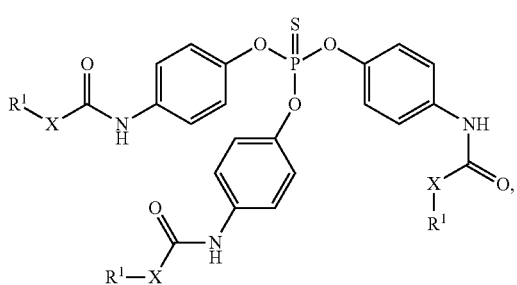

compound of formula (Ib)

Formula (Ib)

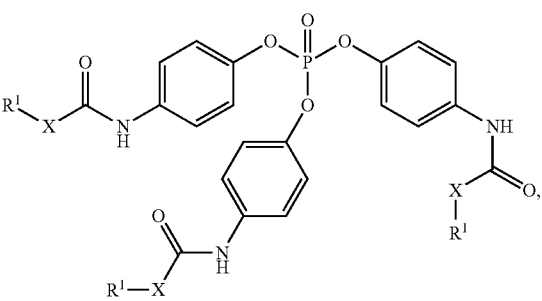

compound of formula (Ic)

Formula (Ic)

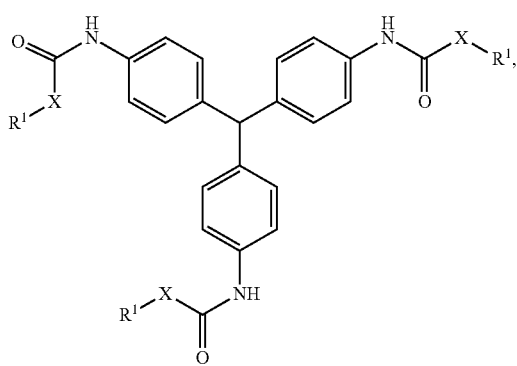

wherein in formulae (Ia) to (Ic)
$R^1$ is independently at each occurrence a radiation-curable group and
X is independently at each occurrence a single bond between $R^1$ and C=O or
a linear, branched or cyclic optionally heteroatom-containing and/or optionally functional-group-substituted hydrocarbon radical and/or mixtures thereof
III) at least one photoinitiator.

In another preferred embodiment the protective layer C comprises
I) at least one thermoplastic resin selected from the group consisting of polyvinyl butyral with $M_w \geq 100\,000$ g/mol or amorphous polymethyl methacrylate with $M_w \geq 100\,000$ g/mol;

II) at least one reactive diluent selected from the group consisting of pentaerythritol triacrylate, compound of formula (Ia)

Formula (Ia)

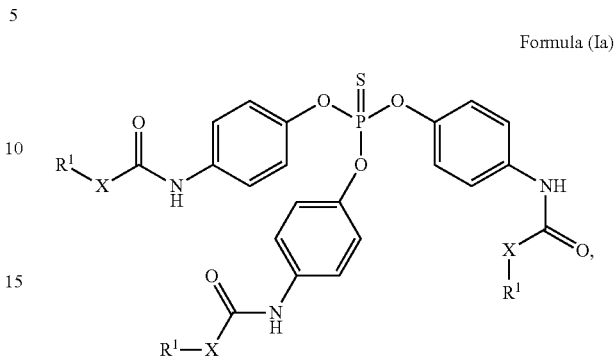

wherein
$R^1$ is independently at each occurrence a radiation-curable group and
X is independently at each occurrence a single bond between $R^1$ and C=O or a linear, branched or cyclic optionally heteroatom-containing and/or optionally functional-group-substituted hydrocarbon radical, and/or mixtures thereof;
III) at least one photoinitiator.

Substrate Layer D

The substrate layer D is preferably a thermoplastic substrate layer/substrate film. Materials or material composites of the thermoplastic substrate layer D are based on polycarbonate (PC), polyethylene terephthalate (PET), amorphous polyesters, polybutylene terephthalate, polyethylene, polypropylene, cellulose acetate, cellulose hydrate, cellulose nitrate, cycloolefin polymers, polystyrene, hydrogenated polystyrene, polyepoxides, polysulfone, thermoplastic polyurethane (TPU), cellulose triacetate (CTA), polyamide (PA), polymethyl methacrylate (PMMA), polyvinyl chloride, polyvinyl acetate, polyvinyl butyral or polydicyclopentadiene or mixtures thereof. They are particularly preferably based on PC, PET, PA, PMMA and CTA. Material composites may be film laminates or coextrudates. Preferred material composites are duplex and triplex films constructed according to one of the schemes A/B, A/B/A or A/B/C. Particularly preferred are PC/PMMA, PC/PA, PC/PET, PET/PC/PET and PC/TPU. It is preferable when substrate layer D is transparent in the spectral region of 400-800 nm.

Very particularly suitable as substrate layer D are mechanically stable thermoplastic polymer substrates made of polyester, in particular those, such as for example polyethylene terephthalate (PET) or polybutylene terephthalate, having a film thickness of <200 μm, <100 μm and >20 μm, preferably <45 μm and >20 μm, whose adherent properties have been reduced by surface modification. Various techniques therefor are contemplated. Thus, inorganic gliding additives may be added, for example kaolin, clay, fuller's earth, calcium carbonate, silicon dioxide, aluminium oxide, titanium oxide, calcium phosphate, and are added in amounts of up to 3%.

To improve the optical properties of such substrates, three-layered co-extruded films where only the outer layers contain such inorganic gliding additives (e.g. Hostaphan RNK) are also used. It is further also possible to apply silicones (e.g. Hostaphan RN30 2PRK) to the surfaces which reduce surface tension and thus the adhesive properties. This allows a particularly easy removal of the layer D at the end of the technical chain of production of a holographic product having the A-B'-C' construction.

The invention likewise provides for the use of the layer construction according to the invention for producing holograms, in particular for producing in-line holograms, off-axis holograms, full-aperture transfer holograms, white light transmission holograms, Denisyuk holograms, off-axis reflection holograms, edge-lit holograms and holographic stereograms.

The invention further provides a sealed holographic medium obtainable by the inventive process for producing an at least partially bonded construction. In one embodiment the holographic medium contains a hologram, containing photopolymer layer having a film thickness of 0.3 µm to 500 µm, preferably of 0.5 µm to 200 µm and particularly preferably of 1 µm to 100 µm. The holographic medium containing a hologram is obtainable by the inventive process for producing a hologram in the inventive layer construction. Holograms may be photoinscribed into the inventive holographic media by appropriate irradiation processes for optical applications in the whole visible and near UV range (300-800 nm).

In particular the hologram may be a reflection, transmission, in-line, off-axis, full-aperture transfer, white light transmission, Denisyuk, off-axis reflection or edge-lit hologram, or else a holographic stereogram, and preferably a reflection, transmission or edge-lit hologram. Preference is given to reflection holograms, Denisyuk holograms, transmission holograms.

Possible optical functions of the holograms correspond to the optical functions of optical elements such as lenses, mirrors, deflecting mirrors, filters, diffusers, directed diffusion elements, diffraction elements, light guides, waveguides, projection screens and/or masks. In addition, a plurality of such optical functions can be combined in such a hologram, for example such that the light is deflected in a different direction according to the incidence of light. For example, it is possible with such setups to build autostereoscopic or holographic electronic displays which allow a stereoscopic visual impression to be experienced without further aids, for example polarizer or shutter glasses, for use in automobile head-up displays or head-mounted displays.

These optical elements frequently have a specific frequency selectivity according to how the holograms have been exposed and the dimensions of the hologram. This is important in particular when monochromatic light sources such as LEDs or laser light are used. For instance, one hologram is required per complementary colour (RGB), in order to deflect light in a frequency-selective manner and at the same time to enable full-colour displays. Therefore in particular display setups a plurality of holograms are to be irradiated inside one another in the medium.

In addition the sealed holographic media according to the invention may also be used to produce holographic images or representations, for example for personal portraits, biometric representations in security documents, or generally of images or image structures for advertising, security labels, brand protection, branding, labels, design elements, decorations, illustrations, collectable cards, images and the like, and also images which can represent digital data, including in combination with the products detailed above. Holographic images may have the impression of a three-dimensional image, or else can represent image sequences, short films or a number of different objects, according to the angle from which and the light source with which (including moving light sources) etc. they are illuminated. Because of this variety of possible designs, holograms, especially volume holograms, constitute an attractive technical solution for the abovementioned application. It is also possible to use such holograms for storage of digital data, using a wide variety of different exposure methods (shift, spatial or angular multiplexing).

The invention likewise provides an optical display comprising an inventive holographic medium.

Examples of such optical displays are imaging displays based on liquid crystals, organic light-emitting diodes (OLEDs), LED display panels, microelectromechanical systems (MEMS) based on diffractive light selection, electrowetting displays (E-ink) and plasma display screens. Optical displays of this kind may be autostereoscopic and/or holographic displays, transmittive and reflective projection screens, displays with switchable restricted emission characteristics for privacy filters and bidirectional multiuser screens, virtual displays, head-up displays, head-mounted displays, illumination symbols, warning lamps, signal lamps, floodlights/headlights and display panels.

The invention likewise provides autostereoscopic and/or holographic displays, projection screens, displays with switchable restricted emission characteristics for privacy filters and bidirectional multiuser screens, virtual displays, head-up displays, head-mounted displays, illumination symbols, warning lamps, signal lamps, floodlights/headlights and display panels comprising an inventive holographic medium.

The invention still further provides a security document and a holographically optical element comprising an inventive holographic medium.

In addition, the invention also provides for the use of an inventive holographic medium for production of chip cards, identity documents, 3D images, product protection labels, labels, banknotes or holographically optical elements, especially for visual displays.

EXAMPLES

The present invention shall hereinbelow be described in more detail via the following drawings and examples.

Test Methods:

Solids content: The reported solids contents were determined according to DIN EN ISO 3251.

Chemicals:

In each case, the CAS number, if known, is reported in square brackets.

Raw Materials for Photopolymer Layer B

Fomrez® UL 28 Urethanization catalyst, commercial product of Momentive Performance Chemicals, Wilton, Conn., USA.

Borchi® Kat 22 Urethanization catalyst, [85203-81-2] commercial product of OMG Borchers GmbH, Langenfeld, Germany.

BYK-310 Silicone-containing surface additive, product of BYK-Chemie GmbH, Wesel, Germany.

Desmodur® N 3900 Product of Covestro AG, Leverkusen, DE, hexane diisocyanate-based polyisocyanate, proportion of iminooxadiazinedione of at least 30%, NCO content: 23.5%.

CGI-909 Tetrabutylammonium tris(3-chloro-4-methylphenyl)-(hexyl)borate, [1147315-11-4], product of BASF SE.

Dye 1 (3,7-bis(diethylamino)phenoxazin-5-ium bis(2-ethylhexyl)sulfosuccinate) was prepared as described in WO 2012062655.

Polyol 1 was produced as described in WO2015091427.

Urethane acrylate 1 simultaneously also RD 2, (phosphorothioyltris(oxybenzene-4,1-diylcarbamoyloxyethane-2,1- diyl) trisacrylate, [1072454-85-3]) was produced as described in WO2015091427.

Urethane acrylate 2, (2-({[3-(methylsulfanyl)phenyl] carbamoyl}oxy)ethyl prop-2-enoate, [1207339-61-4]) was produced as described in WO2015091427.

Additive 1, bis(2,2,3,3,4,4,5,5,6,6,7,7-dodecafluoroheptyl)-(2,2,4-trimethylhexane-1,6-diyl)biscarbamate [1799437-41-4] was produced as described in WO2015091427.

Raw Materials of Protective Layer C
Physically Drying Resins
Mowital B75H—Resin 1 A linear thermoplastic, amorphous polyvinyl butyral having an $M_w$ of 240 000 from Kuraray Europe GmbH, Hattersheim, Germany
Degacryl M547—Resin 2 A linear thermoplastic, amorphous polymethyl methacrylate having an $M_w$ of 500000 from Evonik Industries, Marl, Germany
Desmocoll 400/3—resin 3 A linear thermoplastic flexible polyurethane from Covestro Deutschland AG, Leverkusen, Germany.
Mowital B30HH—resin 4 A linear thermoplastic amorphous polyvinylbutyral having a Mw of 80 000-90 000 from Kuraray Europe GmbH, Hattersheim, Germany,
Pioloform BL 16—resin 5 A linear thermoplastic amorphous, low-viscosity mixed polyvinylacetal, produced from polyvinyl alcohol with butyraldehyde and acetaldehyde having a Mw of 50 000-60 000 from Kuraray Europe GmbH, Hattersheim, Germany,
Acryloyl-Functional Reactive Diluents (RD)
Sartomer SR444D—RV 1 [3524-68-3] Pentaerythritol triacrylate (PETIA) from SARTOMER Division of CRAY VALLEY, Paris, France (Arkema Group).
RD 2 (Phosphorothioyltris(oxybenzene-4,1-diylcarbamoyloxyethane-2,1-diyl) trisacrylate, [1072454-85-3]) produced as described in WO2015091427.
Miramer M410—RD 3 [94108-97-1] Ditrimethylolpropane tetraacrylate from Miwon Specialty Chemical Co., Ltd., Gyeonggi-do, Korea.
Sartomer SR494—RD 4 Quadruply ethoxylated pentaerythritol tetraacrylate (PPTTA) from SARTOMER division of CRAY VALLEY, Paris, France (Arkema Group).
Ebecryl 8465—RD 5 An aliphatic urethane triacrylate oligomer from Allnex, Brussels, Belgium.
Photoinitiators
Esacure One—Initiator 1 [163702-01-0] Oligo[2-hydroxy-2-methyl-1-((4-(1-methylvinyl)phenyl)propanone] from Lamberti S.p.A., Albizzate, Italy
Irgacure 4265—Initiator 2 A mixture of Irgacure® TPO (50% by weight) and Irgacure® 1173 (50% by weight) from BASF, SE, Ludwigshafen, Germany.
Additives
BYK 333 Silicone-containing surface additive from BYK Chemie GmbH, Wesel, Germany
Solvent
Butyl acetate (BA) Butyl acetate from Brenntag GmbH, Mülheim an der Ruhr, Germany.
Methoxypropanol (MP-ol) 1-Methoxy-2-propanol from Brenntag GmbH, Mülheim an der Ruhr, Germany.
Production of Holographic Media (Photopolymer Film)

7.90 g of the above-described polyol component were melted and mixed with 7.65 g of the respective urethane acrylate 2, 2.57 g of the above-described urethane acrylate 1, 5.10 g of the above-described fluorinated urethane (additive 1), 0.91 g of CGI 909, 0.232 g of dye 1, 0.230 g of BYK 310, 0.128 g of Fomrez UL 28 and 3.789 g of ethyl acetate to obtain a clear solution. 1.50 g of Desmodur® N 3900 were then added and the mixture was mixed again.

This solution was then applied to a PET film of 36 μm in thickness in a roll-to-roll coating plant where by means of a knife coater the product was applied in a wet film thickness of 19 μm. At a drying temperature of 85° C. and a drying time of 5 minutes the coated film was dried and subsequently protected with a polyethylene film of 40 μm in thickness. This film was then light-tightly packaged.

Production of the Latent Protective Layer C on Substrate D

The formulations reported in table 1 were produced by mixing the physically drying resins, dissolved at 100° C. in the reported organic solvent and cooled to room temperature, with the reactive diluent. The photoinitiators and also flow control agents were then added in darkness.

TABLE 1

Coating compositions* for production of the latent protective layer C

| | Resin | RD | Weight of ratio of resin to RD in lacquer | Solids content (% by weight) and solvent of coating solution | Viscosity of lacquer at 23° C. [mPas] |
|---|---|---|---|---|---|
| Inventive examples |  |  |  |  |  |
| 01 | Resin 1 | RD 1 | 50/50 | 20% in MP-ol | 4400 |
| 02 | Resin 1 | RD 2 | 20/80 | 28% in MP-ol | 950 |
| 03 | Resin 2 | RD 2 | 20/80 | 28% in MP-ol | 111 |
| Noninventive examples |  |  |  |  |  |
| N 01 | Resin 3 | RD 2 | 40/60 | 26% in butyl acetate | 1120 |
| N 02 | Resin 3 | RD 3 | 50/50 | 25% in butyl acetate | 2220 |
| N 03 | Resin 3 | RD 4 | 50/50 | 25% in butyl acetate | 2100 |
| N 04 | Resin 2 | RD 4 | 25/75 | 25% in MP-ol | 169 |
| N 05 | Resin 2 | RD 3 | 20/80 | 28% in MP-ol | 82 |
| N 06 | Resin 2 | RD 5 | 20/80 | 28% in MP-ol | 278 |
| N 07 | Resin 4 | RD 2 | 20/80 | 30% in MP-ol | 91 |
| N08 | Resin 5 | RD 2 | 20/80 | 35% in MP-al | 98 |

*All coating compositions contain initiator 1 (3% by weight based on solids content of lacquer), initiator 2 (1.5% by weight based on solids content of lacquer) and flow control agent (0.2% by weight based on solids content of lacquer)

The lacquers produced as described hereinabove were applied atop a PET film of 36 μm in thickness (RNK 36 from Mitsubishi Polyester Film GmbH, Wiesbaden, Germany) in a roll-to-roll coating plant by means of a knife coater. At a drying temperature of 85° C. and a drying time of 5 minutes the coated film was dried and subsequently protected with a polyethylene film of 40 μm in thickness. The coating thickness was generally 15-16 μm. This film was then light-tightly packaged.

Production of a Light-Sensitive Film Composite Having the Layer Construction A-B-C-D The production of a light-sensitive film having the layer construction A-B-C-D suitable for the inscribing of holograms includes initially laminating side B of the layer composite A-B onto side C of the layer composite C-D. This is effected in the absence of light by pressing together the two films between the rubber rollers of a laminator. The temperature $T_{Lam}$ of the rollers was preset to 30° C., 60° C. or 90° C. The thus obtained laminate must be stored under protection from light.

Production of Test Holograms in the Layer Construction A-B-C-D

The test holograms for assessment of the layer construction A-B-C-D were prepared as follows: the photopolymer films with the layer construction A-B-C-D, and also the comparative photopolymer films with the layer construction A-B, were in darkness cut to the desired size and using a rubber roller laminated onto a glass sheet having dimensions of 50 mm×70 mm (3 mm thick). The test holograms were produced using a test apparatus which produces Denisyuk reflection holograms using 532 nm laser radiation. The test apparatus consists of a laser source, an optical beam guide system and a holder for the glass coupons. The holder for the glass coupons is mounted at an angle of 13° relative to the beam axis. The laser source generates the radiation which, widened to about 5 cm by means of a specific optical beam path, is guided to the glass coupon in optical contact with the mirror. The holographed object was a mirror about 2 cm×2 cm in size, and so the wavefront of the mirror was reconstructed on reconstructing the hologram. All examples were irradiated with a green 532 nm laser (Newport Corp., Irvine, Calif., USA, cat. no. EXLSR-532-50-CDRH). A shutter was used to irradiate the recording film in a defined manner for 2 seconds. This affords a film composite A-B*-C-D with a hologram in the layer B (exception—noninventive example N 05 where no hologram was formed).

The samples were subsequently placed onto the conveyor belt of a UV source with the substrate side D facing the lamp and exposed twice at a belt speed of 2.5 m/min. The UV source employed was a Fusion UV "D Bulb" No. 558434 KR 85 iron-doped Hg lamp having a total power density of 80 W/cm$^2$. The parameters correspond to a dose of 2× about 2.0 J/cm$^2$ (measured with an ILT 490 Light Bug). After this fixing step the film composite A-B'-C'-D is formed from which the carrier film D was removed.

Table 2 (columns "adhesion of C'-B' in the process" and "removability of film D") shows the results of this step for all tested layer constructions. All inventive protective layers (01 to 02) show a good adhesion in the inventive process of producing the film composites A-B-C-D, A-B*-C-D and A-B'-C'-D. The following step, removal of film D for producing the layer construction A-B'-C', is likewise performable in all inventive examples. Even the noninventive compositions N 01 to N 06 are processable in this way. By contrast, the noninventive compositions N 07 and N 08 produced with the low molecular weight resins 4 and 5 do not exhibit adhesion sufficient for the abovementioned reduction process.

Characterization of Protective Layer C'
Quantitative Analysis of Adhesion of Protective Layer C' on Layer B' of the Holographic Film A-B' According to ISO 2409:2013-02 (E)(Crosscut Test):

Adhesive tape pull-off (adhesive tape employed: 3M Scotch 898) with crosscut (as per ISO 2409:2013-02 (E)) was performed. Performance values vary from full adhesion (ISO performance value: 0) to inadequate (according to ISO 2409:2013-02 (E)) adhesion (ISO performance value: 5).

Assessment of Solvent Resistance

The solvent resistance of the coatings was typically tested with technical quality N-ethyl-2-pyrrolidone (NEP), methyl ethyl ketone (MEK), 1-butanol and ethyl acetate (EA). The solvents were applied to the coating with a cotton bud and protected from evaporation by covering. Unless otherwise stated, a contact time of 60 minutes at about 23° C. was observed. Once the contact time has elapsed, the cotton bud is removed and the test surface is wiped clean with a soft cloth. This is followed by visual inspection immediately and after light scratching with a fingernail.

A distinction is made between the following levels:

0=unchanged; no change visible; not damageable by scratching.

1=slight swelling visible, but not damageable by scratching.

2=change clearly visible, barely damageable by scratching.

3=noticeable change, surface destroyed after firm fingernail pressure.

4=severe change, scratched through to substrate after firm fingernail pressure.

5=destroyed; lacquer already destroyed on wiping off the chemical; the test substance is not removable (eaten into surface).

Within this assessment, the test is typically passed with performance values of 0 and 1. Performance values of >1 represent a "fail". The results are summarized in table 2. All inventive coatings C' made of lacquers 01 to 03 have a very high degree of solvent resistance. By contrast, the layers C' made of the noninventive compositions N 01 to N 03 and N 06 show insufficient solvent resistance. The layers made of compositions N 04 and N 05 do pass the solvent test but in their latent (not UV cured) form have such a strong effect on the photosensitivity of layer B that said layer consequently becomes unusable as an optical recording material (table 3).

Characterization of Test Holograms

The holograms in layer B' of film composite A-B'-C' produced by the inventive process for producing holograms were then subjected to quality analysis by spectroscopy.

On account of the high diffraction efficiency of the volume hologram, the diffractive reflection of such holograms may be analysed in transmission with visible light with a spectrometer (USB 2000 instrument, Ocean Optics, Dunedin, Fla., USA, is employed) and appears in the transmission spectrum as a peak with reduced transmission. Evaluating the transmission curve makes it possible to determine the quality of the hologram according to ISO standard 17901-1:2015(E) taking account of the following measured values; all results from the inventive and noninventive examples are summarized in table 3:

| | |
|---|---|
| FWHM | The width of the transmission peak is determined as "full width at half maximum" (FWHM) in nanometres (nm). |
| $T_{Red} = 100-T_{peak}$ (A-B'-C') | (1) Maximum depth of the transmission peak, this corresponds to the highest diffraction efficiency. Thus, $100-T_{peak(A-B'-C')}$ serves as a measure for the reflection power (or visible "strength" or "quality") of the hologram. |
| ΔT | Calculated difference in maximum depth of the transmission peak of the hologram in layer construction A-B'-C' compared to layer construction A-B' as:<br>$\Delta T = (100\% - T_{peak(A-B'-C')}\%) - (100\% - T_{peak(A-B')}\%)$ (2) |
| $\lambda_{peak}$ | Spectral position of the transmission minimum of the hologram in nanometres (nm). |
| Δλ | Difference in transmission minima in layer construction A-B'-C' compared to $\lambda_w$ of the writing laser as:<br>$\Delta\lambda = \lambda_{peak} - \lambda_w$ (3) |

For the noninventive sample V 1 as a point of reference for the layer construction A-B' the transmission is 91%, the FWHM is at 25 nm and the transmission minimum is at 527 nm.

It is an essential feature of the invention that the optical performance values FWHM, $100-T_{min(A-B'-C')}$ and $\lambda_{peak}$ in the construction A-B'-C' deviate from these optical performance values in the construction A-B only very slightly, if at all. According to the invention the reduction in transmission ($T_{Red}$ %) for construction A-B-C-D is therefore 0 to 20%, preferably from 0 to 10%, lower than for construction A-B (sample V 1 in table 3). For the inventive samples from 01-1 to 03-2 the $T_{Red}$ values are between 76% and 90% and therefore deviate only by −1% to −5% on the transmission scale with respect to sample V 1. The values remain unchanged even after storage at room temperature for 3 days.

The layers C made of the noninventive compositions N 01 to N 06 in their latent (not UV-cured) form have such a strong effect on the photosensitivity of layer B that said layer shows remarkable weakness as an optical recording material. The $T_{Red}$ values of the holograms recorded therein are substantially lower. In the case of N 05 no hologram whatsoever can be recorded.

A further aspect of the quality of the holograms relates to $\lambda_{peak}$. For application of the holographic materials in demanding optical functions it is enormously important that $\lambda_{peak}$ of the inscribed hologram deviates from $\lambda_w$ of the writing laser to the smallest possible extent. It is preferable when $\Delta\lambda$ is +/−10 nm, more preferably +/−5 nm, particularly preferably +/−3 nm.

As is shown in table 3 $\Delta\lambda$ of the comparative sample V 1 is −5 nm. In this context the inventive samples are at least no poorer and in most cases are in fact more advantageous. Their deviation from $\Delta\lambda$ is 0 to 5 nm. The noninventive samples deviate markedly more severely.

TABLE 2

Transferability of the protective layer C onto the holographic film A-B and protective quality of coatings C'

| Layer C | Sample | $T_{Lam.}$ [° C.] | C'-B' adhesion in the process | Removability of film D | C'-B' adhesion (crosscut) | Solvent resistance (1 h) of C' against NEP/MEK/butanol/EA |
|---|---|---|---|---|---|---|
| none[#] | V 1 | — | — | — | — | 5/5/1/5 (after 10 min) |
| Inventive examples | | | | | | |
| 01 | 01-1 | 30 | + | + | 2 | 0/0/0/0 |
| 01 | 01-2 | 30 | + | + | 3 | 0/0/0/0 |
| 01 | 01-3 | 60 | + | + | 2 | 0/0/0/0 |
| 01 | 01-4 | 60 | + | + | 4 | 0/0/0/0 |
| 01 | 01-5 | 90 | + | + | 2 | 0/0/0/0 |
| 02 | 02-1 | 30 | + | + | 0 | 0/0/0/0 |
| 02 | 02-2 | 30 | + | + | 0 | 0/0/0/0 |
| 02 | 02-3 | 60 | + | + | 1 | 0/0/0/0 |
| 02 | 02-4 | 60 | + | + | 0 | 0/0/0/0 |
| 02 | 02-5 | 90 | + | + | 0 | 0/0/0/0 |
| 03 | 03-1 | 30 | + | + | 5 | 0/0/0/0 |
| 03 | 03-2 | 30 | + | + | 5 | 0/0/0/0 |
| Noninventive examples | | | | | | |
| N 01 | N 01-1 | 60 | + | + | 0 | 4/4/4/4 |
| N 02 | N 02-1 | 60 | + | + | 0 | 4/4/4/4 |
| N 03 | N 03-1 | 30 | + | + | 3 | 5/5/4/5 |
| N 04 | N 04-1 | 30 | + | + | 5 | 0/1/0/0 |
| N 05 | N 05.1 | 30 | + | + | 5 | 0/0/0/0 |
| N 06 | N 06-1 | 30 | + | + | 0 | 5/5/4/5 |
| N 07 | N 07-1 | 30 | − | Assessment not possible, no adhesion A-B'-C'-D | | | |
| N 07 | N 07-2 | 60 | − | Assessment not possible, no adhesion A-B'-C'-D | | | |
| N 07 | N 07-3 | 90 | − | Assessment not possible, no adhesion A-B'-C'-D | | | |
| N 08 | N 08-1 | 30 | − | Assessment not possible, no adhesion A-B'-C'-D | | | |
| N 08 | N 08-2 | 60 | − | Assessment not possible, no adhesion A-B'-C'-D | | | |
| N 08 | N 08-3 | 90 | − | Assessment not possible, no adhesion A-B'-C'-D | | | |

[#]reference sample

TABLE 3

Characterization of test holograms after a) inscription into the A-B-C-D film composite, b) fixing by UV-VIS of ~4 J/cm². Assessment is of the film composite A-B'-C' obtained from A-B'-C'-D by removal of D

| | | | Characterization of test holograms | | | | | | | | |
|---|---|---|---|---|---|---|---|---|---|---|---|
| | | | 1 h after application of protective layer | | | | | 3 days after application of protective layer | | | | |
| Layer C | Sample | $T_{Lam.}$ [° C.] | $100-T_{peak}$ (A-B'-C') [%] | $\Delta T$ [%] | FWHM [nm] | $\lambda_{peak}$ [nm] | $\Delta\lambda$ [nm] | $100-T_{peak}$ (A-B'-C') [%] | $\Delta T$ [%] | FWHM [nm] | $\lambda_{peak}$ [nm] | $\Delta\lambda$ [nm] |
| none[#] | V 1 | — | 91** | — | 25 | 527 | −5 | | | | | |
| Inventive examples | | | | | | | | | | | | |
| 01 | 01-1 | 30 | 76 | −15 | 22 | 530 | −2 | 76 | −15 | 22 | 529 | −3 |
| 01 | 01-2 | 30 | 81 | −10 | 23 | 530 | −2 | 85 | −6 | 22 | 529 | −3 |
| 01 | 01-3 | 60 | 83 | −8 | 18 | 528 | −4 | 81 | −10 | 18 | 527 | −5 |
| 01 | 01-4 | 60 | 84 | −7 | 24 | 530 | −2 | 84 | −7 | 22 | 529 | −3 |
| 01 | 01-5 | 90 | 83 | −8 | 16 | 529 | −3 | 83 | −8 | 16 | 528 | −4 |
| 02 | 02-1 | 30 | 83 | −8 | 17 | 527 | −5 | 86 | −5 | 17 | 527 | −5 |
| 02 | 02-2 | 30 | 88 | −3 | 19 | 529 | −3 | 87 | −4 | 19 | 530 | −2 |
| 02 | 02-3 | 60 | 83 | −8 | 16 | 530 | −2 | 81 | −10 | 15 | 530 | −2 |
| 02 | 02-4 | 60 | 90 | −1 | 19 | 529 | −3 | 90 | −1 | 19 | 529 | −3 |
| 02 | 02-5 | 90 | 83 | −8 | 16 | 528 | −4 | 83 | −8 | 16 | 528 | −4 |
| 03 | 03-1 | 30 | 80 | −11 | 15 | 532 | 0 | 82 | −9 | 15 | 533 | +1 |
| 03 | 03-2 | 30 | 85 | −6 | 17 | 533 | +1 | 84 | −7 | 16 | 534 | +2 |

TABLE 3-continued

Characterization of test holograms after a) inscription into the A-B-C-D film composite,
b) fixing by UV-VIS of ~4 J/cm².
Assessment is of the film composite A-B'-C' obtained from A-B'-C'-D by removal of D

| | | | Characterization of test holograms | | | | | | | | |
|---|---|---|---|---|---|---|---|---|---|---|---|
| | | | 1 h after application of protective layer | | | | | 3 days after application of protective layer | | | |
| Layer C | Sample | $T_{Lam.}$ [°C.] | 100-$T_{peak}$ (A-B'-C') [%] | $\Delta T$ [%] | FWHM [nm] | $\lambda_{peak}$ [nm] | $\Delta\lambda$ [nm] | 100-$T_{peak}$ (A-B'-C') [%] | $\Delta T$ [%] | FWHM [nm] | $\lambda_{peak}$ [nm] | $\Delta\lambda$ [nm] |
| | | | Noninventive examples | | | | | | | | |
| N 01 | N01-1 | 60 | 70 | −21 | 15 | 536 | +4 | 78 | −13 | 15 | 537 | +5 |
| N 02 | N02-1 | 60 | 25 | −66 | 13 | 529 | −3 | — | — | — | — | — |
| N 03 | N03-1 | 30 | 67 | −24 | 17 | 534 | +2 | 56 | −35 | 15 | 523 | −9 |
| N 04 | N04-1 | 30 | 41 | −50 | 11 | 545 | +13 | 39 | −52 | 11 | 544 | +12 |
| N 05 | N05-1 | 30 | * | | | | | * | | | | |
| N 06 | N06-1 | 30 | 29 | −62 | 13 | 560 | +28 | 23 | −68 | 14 | 559 | +27 | reference sample; *hologram not inscribable; **measured in layer construction A-B'

The invention claimed is:

1. A Layer construction comprising a curable protective layer C and an areal photopolymer layer B comprising polyurethane matrix polymers, acrylate writing monomers and photoinitiators, which is at least partly joined to the protective layer C, wherein the protective layer C comprises
   I) at least one thermoplastic resin selected from the group consisting of polyvinylbutyral with $M_w \geq 100\,000$ g/mol or amorphous polymethyl methacrylate with $M_w \geq 100\,000$ g/mol;
   II) at least one reactive diluent selected from the group consisting of pentaerythritol triacrylate, dipentaerythritol pentaacrylate, dipentaerythritol hexaacrylate, compound of formula (Ia)

Formula (Ia)

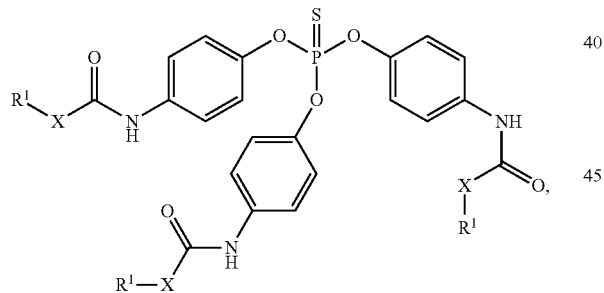

compound of formula (Ib)

Formula (Ib)

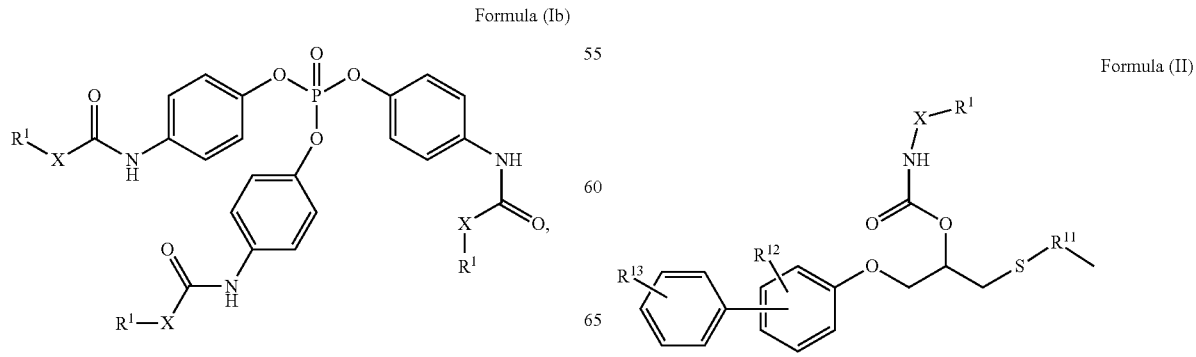

compound of formula (Ic)

Formula (Ic)

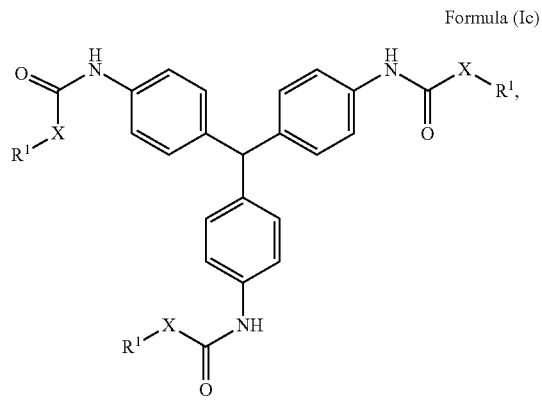

wherein in formulae (Ia) to (Ic)

$R^1$ is independently at each occurrence a radiation-curable group and

X is independently at each occurrence a single bond between $R^1$ and C=O or a linear, branched or cyclic optionally heteroatom-containing and/or optionally functional-group-substituted hydrocarbon radical, compound of formula (II)

Formula (II)

-continued $$\text{MeS-CH}_2\text{-CH(O-C(O)-NH-X-R}^1\text{)-CH}_2\text{-O-C}_6\text{H}_{4-n}(R^{12})_n\text{-C}_6\text{H}_{5-m}(R^{13})_m$$

wherein in formula (II)

$R^1$ and X are as defined in formula (Ia)-(Ic), $R^{11}$ is a linear or branched, optionally heteroatom-substituted aliphatic, aromatic or araliphatic radical, $R^{12}$ is independently at each occurrence up to four substituents selected from methyl, ethyl, propyl, n-butyl, tert-butyl, chlorine, bromine, iodine, methylthio, phenyl and/or phenylthio, $R^{13}$ is independently at each occurrence up to five substituents selected from methyl, ethyl, propyl, n-butyl, tert-butyl, chlorine, bromine, iodine, methylthio, phenyl and/or phenylthio, compound of formula (III)

Formula (III)

[naphthalene with positions 1, 2, 3, 4, 4a, 5, 6, 7, 8, 8a]

i) which is substituted at at least one of the carbon atoms 1, 2, 3, 4, 5, 6, 7, 8 with an $R_{acryl}$ radical of formula (IV), Formula (IV)

$$-R^{21}-R^{22}-R^{23}-O-R^1,$$

wherein in formula (IV)

$R^1$ is as defined in formula (Ia)-(Ic), $R^{21}$ is oxygen or sulfur, $R^{22}$ is a carboxamide (—C(O)N—) or a carboxylic ester (—C(O)O—) or a sulfonamide (—SO$_2$N—) group, $R^{23}$ is a saturated or unsaturated or linear or branched optionally substituted radical comprising 2-10 carbon atoms or a polyether comprising up to five (—CH$_2$—CH$_2$—O—)— or (—C(CH$_3$)H—CH$_2$—O—)— groups or a polyamine comprising up to five nitrogen atoms, and ii) the compound of formula (III) is at least one further carbon atom 1, 2, 3, 4, 5, 6, 7, 8 substituted with a radical of formula (V), Formula (V)

[naphthalene with positions 1', 2', 3', 4', 4a', 5', 6', 7', 8', 8a'], wherein in formula (V)

the carbon atoms of the compound of formula (V) are each independently substituted with hydrogen, halogen, a cyano group, a nitro group or an optionally substituted alkyl, alkenyl, alkynyl, aralkyl, aryl or heteroaryl group or an optionally substituted alkoxy or alkylthio group or any substituted carbamoyl group, which also may be linked bridgingly to a radical of formula (III), or a trifluoromethyl group or a trifluoromethoxy group or an $R_{acryl'}$ radical of formula (VI), Formula (VI)

$$-R^{21'}-R^{22'}-R^{23'}-O-R^{1'},$$

wherein in formula (VI)

$R^{1'}$ has the same definition as $R^1$ in formula (IV), $R^{21'}$ is oxygen or sulfur, $R^{22'}$ is a carboxamide (—C(O)N—) or a carboxylic ester (—C(O)O—) or a sulfonamide (—SO2N—) group, $R^{23'}$ is a saturated or unsaturated or linear or branched optionally substituted radical comprising 2-10 carbon atoms or a polyether comprising up to five (—CH$_2$—CH$_2$—O—)— or (—C(CH$_3$)H—CH$_2$—O—)— groups or a polyamine comprising up to five nitrogen atoms, iii) the remaining carbon atoms of the compound of formula (III) are each independently substituted with hydrogen, halogen, a cyano group, a nitro group or an optionally substituted alkyl, alkenyl, alkynyl, aralkyl, aryl or heteroaryl group or an optionally substituted alkoxy or alkylthio group or a trifluoromethyl group or a trifluoromethoxy group, and compound of formula (VII)

(VII)

[triazine ring with $R^{31}$, $R^{32}$, $R^{33}$ substituents]

wherein in formula (VII)

$R^{31}$, $R^{32}$, $R^{33}$ are each independently of one another OH, halogen or an organic radical, wherein at least one of the radicals is an organic radical comprising a radiation-curable group; and III) comprises at least one photoinitiator.

2. The layer construction according to claim 1, wherein the photopolymer layer B is disposed on a substrate layer A, wherein the photopolymer layer B is on one side at least partly joined to the substrate layer A and the photopolymer layer B is on the other side at least partly joined to the protective layer C.

3. The layer construction according to claim 1, wherein the protective layer C is disposed on a substrate layer D, wherein the protective layer C is on one side at least partly joined to the substrate layer D and the protective layer C is on the other side at least partly joined to the photopolymer layer B.

4. The layer construction according to claim 1, wherein the layer construction consists of at least four layers at least partly joined to one another, wherein the layers are arranged directly atop one another in the sequence substrate layer A, photopolymer layer B, protective layer C and substrate layer D.

5. The layer construction according to claim 1, wherein the reactive diluent is pentaerythritol triacrylate, a compound of formulae (Ia), (Ib), (Ic), (II), (III), (VII) and/or mixtures thereof.

6. The layer construction according to claim 1, wherein the protective layer C has a thickness of 1 to 100 μm.

7. The layer construction according to claim 1, wherein the protective layer C further contains a UV absorber.

8. A process for producing a layer construction according to claim 1, wherein atop a photopolymer layer B a protective layer C is applied wherein the protective layer C comprises
I) at least one thermoplastic resin selected from the group consisting of polyvinylbutyral with $M_w \geq 100\,000$ g/mol or amorphous polymethyl methacrylate with $M_w \geq 100\,000$ g/mol;
II) at least one reactive diluent selected from the group consisting of pentaerythritol triacrylate, dipentaerythritol pentaacrylate, dipentaerythritol hexaacrylate, compound of formula (Ia)

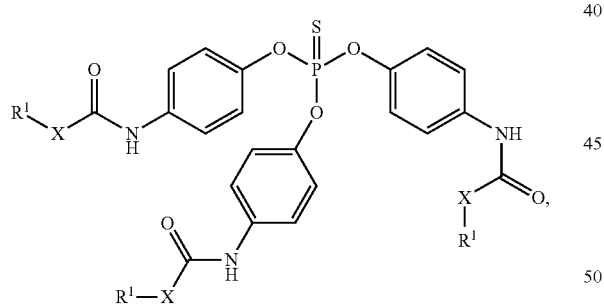

Formula (Ia)

compound of formula (Ib)

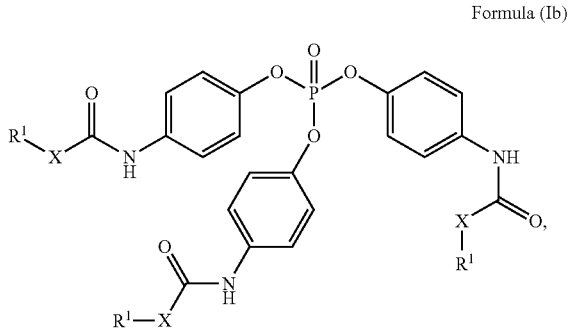

Formula (Ib)

compound of formula (Ic)

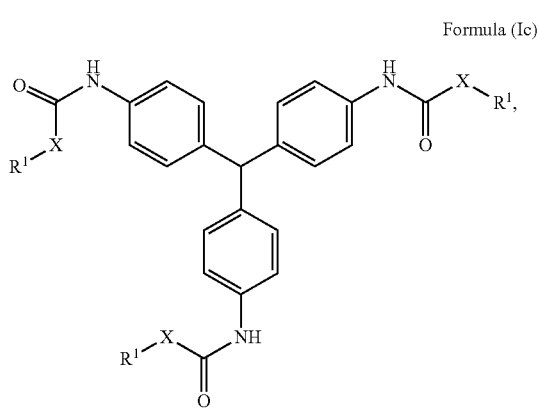

Formula (Ic)

wherein in formulae (Ia) to (Ic)
$R^1$ is independently at each occurrence a radiation-curable group and
X is independently at each occurrence a single bond between $R^1$ and C=O or a linear, branched or cyclic optionally heteroatom-containing and/or optionally functional-group-substituted hydrocarbon radical,
compound of formula (II)

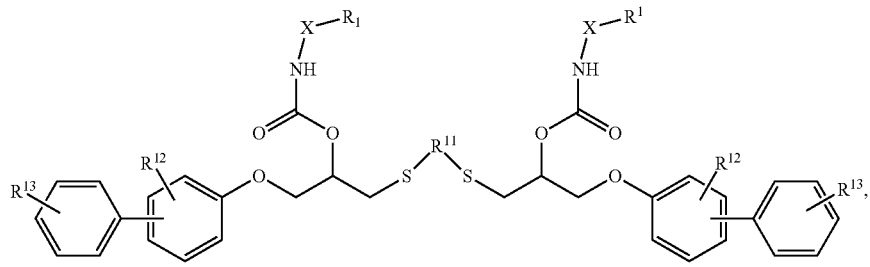

Formula (II)

wherein in formula (II)
R$^1$ and X are as defined in formula (Ia)-(Ic),
R$^{11}$ is a linear or branched, optionally heteroatom-substituted aliphatic, aromatic or araliphatic radical,
R$^{12}$ is independently at each occurrence up to four substituents selected from methyl, ethyl, propyl, n-butyl, tert-butyl, chlorine, bromine, iodine, methylthio, phenyl and/or phenylthio,
R$^{13}$ is independently at each occurrence up to five substituents selected from methyl, ethyl, propyl, n-butyl, tert-butyl, chlorine, bromine, iodine, methylthio, phenyl and/or phenylthio,
compound of formula (III)

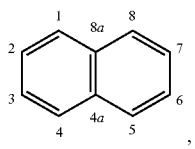

Formula (III)

i) which is substituted at at least one of the carbon atoms 1, 2, 3, 4, 5, 6, 7, 8 with an R$_{acryl}$ radical of formula (IV),

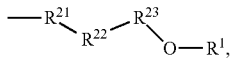

Formula (IV)

wherein in formula (IV)
R$^1$ is as defined in formula (Ia)-(Ic),
R$^{21}$ is oxygen or sulfur,
R$^{22}$ is a carboxamide (—C(O)N—) or a carboxylic ester (—C(O)—) or a sulfonamide (—SO$_2$N—) group,
R$^{23}$ is a saturated or unsaturated or linear or branched optionally substituted radical comprising 2-10 carbon atoms or a polyether comprising up to five (—CH$_2$—CH$_2$—O—)— or (—C(CH$_3$)H—CH$_2$—O—)— groups or a polyamine comprising up to five nitrogen atoms, and
ii) the compound of formula (III) is at least one further carbon atom 1, 2, 3, 4, 5, 6, 7, 8 substituted with a radical of formula (V),

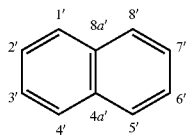

Formula (V)

wherein in formula (V)
the carbon atoms of the compound of formula (V) are each independently substituted with hydrogen, halogen, a cyano group, a nitro group or an optionally substituted alkyl, alkenyl, alkynyl, aralkyl, aryl or heteroaryl group or an optionally substituted alkoxy or alkylthio group or any substituted carbamoyl group, which also may be linked bridgingly to a radical of formula (III), or a trifluoromethyl group or a trifluoromethoxy group or an R$_{acryl'}$ radical of formula (VI),

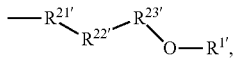

Formula (VI)

wherein in formula (VI)
R$^{1'}$ has the same definition as R$^1$ in formula (IV),
R21' is oxygen or sulfur,
R22' is a carboxamide (—C(O)N—) or a carboxylic ester (—C(O)O—) or a sulfonamide (—SO$_2$N—) group,
R$^{23'}$ is a saturated or unsaturated or linear or branched optionally substituted radical comprising 2-10 carbon atoms or a polyether comprising up to five (—CH$_2$—CH$_2$—O—)— or (—C(CH$_3$)H—CH$_2$—O—)— groups or a polyamine comprising up to five nitrogen atoms, iii) the remaining carbon atoms of the compound of formula (III) are each independently substituted with hydrogen, halogen, a cyano group, a nitro group or an optionally substituted alkyl, alkenyl, alkynyl, aralkyl, aryl or heteroaryl group or an optionally substituted alkoxy or alkylthio group or a trifluoromethyl group or a trifluoromethoxy group, and compound of formula (VII)

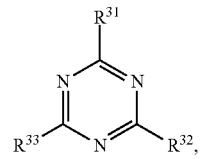

(VII)

wherein in formula (VII)
R$^{31}$, R$^{32}$, R$^{33}$ are each independently of one another OH, halogen or an organic radical, wherein at least one of the radicals is an organic radical comprising a radiation-curable group; and III) comprises at least one photoinitiator.

9. The process according to claim 8, wherein in a first step the photopolymer layer B is applied atop a substrate layer A to afford a layer composite A-B, in a second step the protective layer C is applied atop a substrate layer D to afford a layer composite C-D and in a third step the layer composite A-B is areally joined to the layer composite C-D to obtain a layer composite A-B-C-D, wherein the layer composite A-B is joined to the layer composite C-D by lamination.

10. A process for producing a hologram comprising the steps of:
a) providing a multilayer recording material containing a layer composite A-B-C-D comprising
I) a substrate layer A,
II) a photopolymer layer B comprising polyurethane matrix polymers, acrylate writing monomers and photoinitiators;
III) a protective layer C, comprising
IIIa) at least one thermoplastic resin selected from the group consisting of polyvinylbutyral with Mw≥100 000 g/mol or amorphous polymethyl methacrylate with Mw≥100 000 g/mol;
IIIb) at least one reactive diluent selected from the group consisting of pentaerythritol triacrylate, dipentaerythritol pentaacrylate, dipentaerythritol hexaacrylate, compound of formula (Ia)

Formula (Ia)

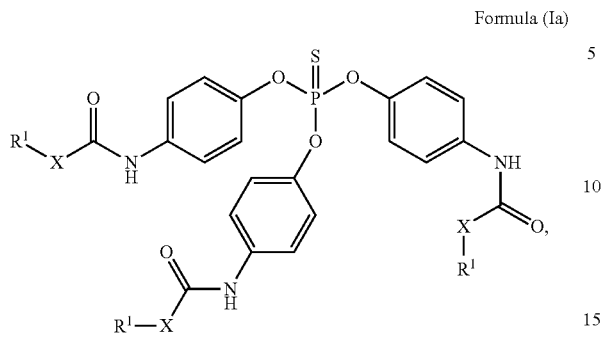

compound of formula (Ib)

Formula (Ib)

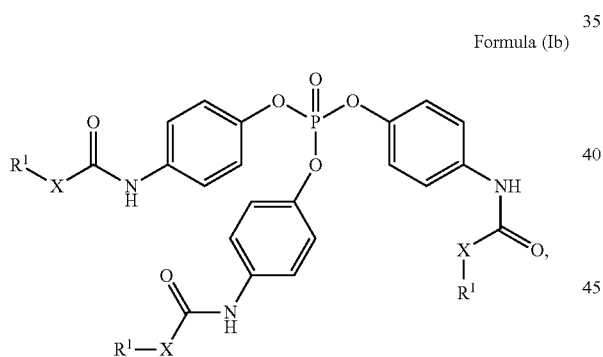

compound of formula (Ic)

Formula (Ic)

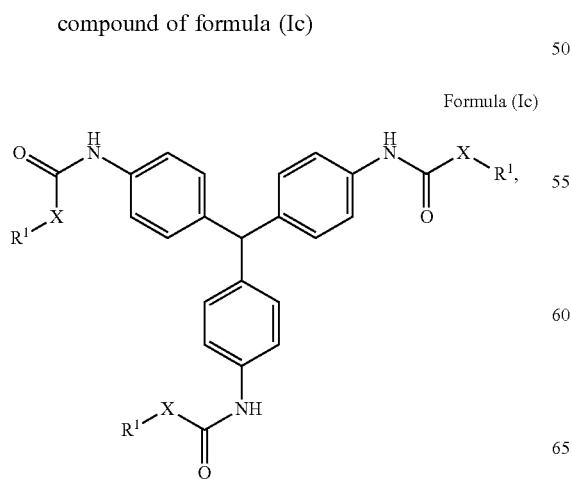

wherein in formulae (Ia) to (Ic)

$R^1$ is independently at each occurrence a radiation-curable group and

X is independently at each occurrence a single bond between $R^1$ and C=O or a linear, branched or cyclic optionally heteroatom-containing and/or optionally functional-group-substituted hydrocarbon radical, compound of formula (II)

Formula (II)

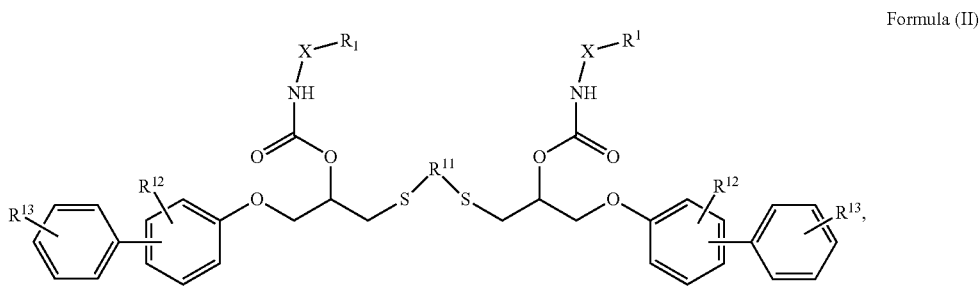

wherein in formula (II)
$R^1$ and X are as defined in formula (Ia)-(Ic),
$R^{11}$ is a linear or branched, optionally heteroatom-substituted aliphatic, aromatic or araliphatic radical,
$R^{12}$ is independently at each occurrence up to four substituents selected from methyl, ethyl, propyl, n-butyl, tert-butyl, chlorine, bromine, iodine, methylthio, phenyl and/or phenylthio,
$R^{13}$ is independently at each occurrence up to five substituents selected from methyl, ethyl, propyl, n-butyl, tert-butyl, chlorine, bromine, iodine, methylthio, phenyl and/or phenylthio,
compound of formula (III)

Formula (III)

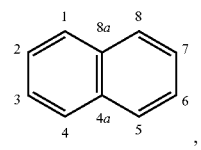

i) which is substituted at least one of the carbon atoms 1, 2, 3, 4, 5, 6, 7, 8 with an $R_{acryl}$ radical of formula (IV), Formula (IV)

wherein in formula (IV)
R¹ is as defined in formula (Ia)-(Ic),
R²¹ is oxygen or sulfur,
R²² is a carboxamide (—C(O)N—) or a carboxylic ester (—C(O)O—) or a sulfonamide (—SO₂N—) group,
R²³ is a saturated or unsaturated or linear or branched optionally substituted radical comprising 2-10 carbon atoms or a polyether comprising up to five (—CH₂—CH₂—O—)— or (—C(CH₃)H—CH₂—O—)— groups or a polyamine comprising up to five nitrogen atoms, and
ii) the compound of formula (III) is at least one further carbon atom 1, 2, 3, 4, 5, 6, 7, 8 substituted with a radical of formula (V), Formula (V)

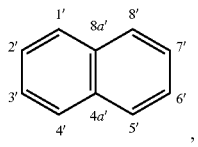

, wherein in formula (V)
the carbon atoms of the compound of formula (V) are each independently substituted with hydrogen, halogen, a cyano group, a nitro group or an optionally substituted alkyl, alkenyl, alkynyl, aralkyl, aryl or heteroaryl group or an optionally substituted alkoxy or alkylthio group or any substituted carbamoyl group, which also may be linked bridgingly to a radical of formula (III), or a trifluoromethyl group or a trifluoromethoxy group or an $R_{acryl'}$ radical of formula (VI), Formula (VI)

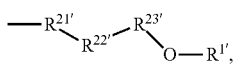

wherein in formula (VI)
R¹' has the same definition as R¹ in formula (IV),
R²¹' is oxygen or sulfur,
R²²' is a carboxamide (—C(O)N—) or a carboxylic ester (—C(O)O—) or a sulfonamide (—SO₂N—) group,
R²³' is a saturated or unsaturated or linear or branched optionally substituted radical comprising 2-10 carbon atoms or a polyether comprising up to five (—CH₂—CH₂—O—)— or (—C(CH₃)H—CH₂—O—)— groups or a polyamine comprising up to five nitrogen atoms,
iii) the remaining carbon atoms of the compound of formula (III) are each independently substituted with hydrogen, halogen, a cyano group, a nitro group or an optionally substituted alkyl, alkenyl, alkynyl, aralkyl, aryl or heteroaryl group or an optionally substituted alkoxy or alkylthio group or a trifluoromethyl group or a trifluoromethoxy group, and
compound of formula (VII)

(VII)

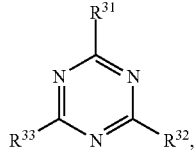

wherein in formula (VII)
R³¹, R³², R³³ are each independently of one another OH, halogen or an organic radical, wherein at least one of the radicals is an organic radical comprising a radiation-curable group; and
IIIc) comprises at least one photoinitiator, and
IV) a substrate layer D,
wherein the layers in the sequence substrate layer A, photopolymer layer B, protective layer C and substrate layer D are arranged directly atop one another;
b) photoinscribing a hologram into the photopolymer layer B to form a layer composite A-B*-C-D, wherein B* is a photopolymer layer with an inscribed hologram;
c) subjecting the layer composite A-B*-C-D from step (b) to actinic radiation, to form a layer composite A-B'-C'-D, wherein B' is the bleached, through-polymerized and no-longer-photosensitive photopolymer layer B comprising a fixed hologram and C' is the cured protective layer C; and
d) delaminating the substrate layer D of the layer composite A-B'-C'-D from step (c) to form a layer composite A-B'-C'.

11. A sealed holographic medium comprising a layer construction A-B'-C' obtained by the process according to claim 10.

12. An optical display comprising the sealed holographic medium according to claim 11, wherein the optical display is selected from the group consisting of autostereoscopic and/or holographic displays, projection screens, displays with switchable restricted emission characteristics for privacy filters and bidirectional multiuser screens, virtual displays, head-up displays, head-mounted displays, illumination symbols, warning lamps, signal lamps, floodlights/headlights and display panels.

13. A security document comprising the sealed holographic medium according to claim 11.

14. A method comprising utilizing the layer construction according to claim 1 comprising exposing the layer and thereby producing holograms selected from the group consisting of in-line holograms, off-axis holograms, full-aperture transfer holograms, white light transmission holograms, Denisyuk holograms, off-axis reflection holograms, edge-lit holograms and holographic stereograms.

* * * * *